(12) United States Patent
Zhang et al.

(10) Patent No.: US 11,841,714 B2
(45) Date of Patent: *Dec. 12, 2023

(54) APPARATUS AND METHOD OF WIRELESS COMMUNICATION SYSTEM, AND COMPUTER-READABLE STORAGE MEDIUM

(71) Applicant: Sony Group Corporation, Tokyo (JP)

(72) Inventors: Wenbo Zhang, Beijing (CN); Penshun Lu, Beijing (CN); Chen Sun, Beijing (CN)

(73) Assignee: SONY GROUP CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/750,416

(22) Filed: May 23, 2022

(65) Prior Publication Data
US 2022/0283595 A1  Sep. 8, 2022

Related U.S. Application Data

(63) Continuation of application No. 16/637,768, filed as application No. PCT/CN2018/099276 on Aug. 8, 2018, now Pat. No. 11,416,009.

(30) Foreign Application Priority Data

Aug. 11, 2017 (CN) .......................... 201710686046.7

(51) Int. Cl.
*G05D 1/00* (2006.01)
*B64C 39/02* (2023.01)
(Continued)

(52) U.S. Cl.
CPC ........... *G05D 1/106* (2019.05); *B64C 39/024* (2013.01); *G08G 5/0069* (2013.01); *H04W 4/025* (2013.01); *B64U 2201/20* (2023.01)

(58) Field of Classification Search
CPC ........ G05D 1/106; G05D 1/00; B64C 39/024; G08G 5/0069; G08G 5/0026;
(Continued)

(56) References Cited

U.S. PATENT DOCUMENTS 9,632,501 B1  4/2017 Yang et al.
9,870,566 B2  1/2018 Gong et al.
(Continued)

FOREIGN PATENT DOCUMENTS

CN  105035335 A  11/2015
CN  105391939 A  3/2016
(Continued)

OTHER PUBLICATIONS

Wang Yu et al. Research on Asymmetric Link of UAV Aided Layered Network, Chinese Journal of Sensors and Actuators, No. 05, May 15, 2007.

(Continued)

*Primary Examiner* — Yonel Beaulieu
(74) *Attorney, Agent, or Firm* — XSENSUS LLP

(57) ABSTRACT

An apparatus and a method of a wireless communication system, and a computer-readable storage medium are disclosed. The apparatus comprises a processing circuit. The processing circuit is configured to configure, directly or indirectly on the basis of one or more height thresholds for user equipment and a current height of the user equipment, operation of the user equipment. According to at least one aspect of the embodiments of the disclosure, configuring, on the basis of a height threshold, operation of a user equipment optimizes communication performance in an unmanned aerial vehicle communication scenario.

20 Claims, 31 Drawing Sheets

(51) Int. Cl.
  *G08G 5/00* (2006.01)
  *H04W 4/00* (2018.01)
  *G05D 1/10* (2006.01)
  *H04W 4/02* (2018.01)

(58) Field of Classification Search
  CPC ...... G08G 5/0039; G08G 5/0013; G08G 5/00; H04W 4/025; H04W 72/51; H04W 4/44; H04W 4/46; H04W 24/02; H04W 24/10; H04W 72/0446; H04W 74/0833; H04W 4/00; B64U 2201/20
  See application file for complete search history.

(56) References Cited

U.S. PATENT DOCUMENTS

| | | | |
|---|---|---|---|
| 11,416,009 B2* | 8/2022 | Zhang | ......... G08G 5/0039 |
| 2011/0301784 A1 | 12/2011 | Oakley et al. | |
| 2015/0339933 A1 | 11/2015 | Batla et al. | |
| 2016/0371987 A1 | 12/2016 | Kotecha | |
| 2017/0068251 A1 | 3/2017 | Zhang et al. | |
| 2017/0131717 A1 | 5/2017 | Kugelmass | |
| 2017/0215178 A1 | 7/2017 | Kim et al. | |
| 2017/0243494 A1 | 8/2017 | Taveira | |
| 2017/0283038 A1 | 10/2017 | Lin | |
| 2018/0155011 A1 | 6/2018 | Greiner et al. | |
| 2018/0324581 A1* | 11/2018 | Phuyal | ......... H04W 36/30 |
| 2018/0324662 A1* | 11/2018 | Phuyal | ......... H04W 48/18 |
| 2020/0245174 A1* | 7/2020 | Lu | ......... H04W 72/541 |
| 2021/0269174 A1 | 9/2021 | Shuff | |

FOREIGN PATENT DOCUMENTS

| | | | |
|---|---|---|---|
| CN | 105594233 | A | 5/2016 |
| CN | 105761550 | A | 7/2016 |
| CN | 105793792 | A | 7/2016 |
| CN | 105867405 | A | 8/2016 |
| CN | 106454069 | A | 2/2017 |
| CN | 106548534 | A | 3/2017 |
| JP | 2017-511764 | A | 4/2017 |
| WO | WO-2017048446 | A1 | 3/2017 |
| WO | WO-2022154726 | A1 * | 7/2022 |
| WO | WO-2022187732 | A1 * | 9/2022 |
| WO | WO-2022264086 | A1 * | 12/2022 |
| WO | WO-2023278913 | A1 * | 1/2023 |

OTHER PUBLICATIONS

International Search Report and Written Opinion dated Oct. 26, 2018 for PCT/CN2018/099276 filed on Aug. 8, 2018, 8 pages.
Extended European search report dated Jul. 31, 2020, in corresponding European patent Application No. 18843495.5, 10 pages.

* cited by examiner

APPARATUS AND METHOD OF WIRELESS COMMUNICATION SYSTEM, AND COMPUTER-READABLE STORAGE MEDIUM

CROSS-REFERENCE TO RELATED APPLICATIONS

The present application is a continuation of U.S. application Ser. No. 16/637,768, filed Feb. 10, 2020, which is U.S. Pat. No. 11,416,009, which is based on PCT filing PCT/CN2018/099276, filed Aug. 08, 2018, which claims priority to Chinese Patent Application No. 201710686046.7, filed Aug. 11, 2017 with the Chinese Patent Office, each of which is incorporated herein by reference in its entirety.

FIELD

The present disclosure relates to the technical field of wireless communications, and in particular to an Unmanned Aerial Vehicle (UAV) communication technology based on long term evolution (LTE).

BACKGROUND

Nowadays, there are increasing interests in using unmanned aerial vehicles (UAVs) in a cellular network. The UAVs are increasingly used in many commercial application scenarios, such as application scenarios of search and rescue, critical infrastructure monitoring, wildlife protection, flight cameras, and surveillance, which may develop rapidly in the future few years. With distribution of the existing LTE networks, the UAVs may be well served. Therefore, if the UAVs are connected to current LTE networks, it will definitely enhance the application of the UAVs in those scenarios.

However, the UAV is different from an ordinary user equipment (UE) on the ground For example, a flight height and a flight speed of the UAV are much greater than those of the ordinary UE on the ground. In a case that the flight height of the UAV is relatively low (relative to that of a base station), the UAV may be regarded as an ordinary UE. However, in a case that the flight height of the UAV is relatively high (for example, higher than that of the base station), uplink signals from the UAV may be received by more cells due to the line-of-sight (LoS). In this case, the uplink signals from the UAV may be regarded as interference signals for cells other than a serving cell of the UAV, which may affect normal communication of devices, such as UEs and Internet of Things (IoT), in these cells. Therefore, there is an urgent need to enhance the LTE-based UAV communication.

SUMMARY

Brief summary of the present disclosure is given hereinafter, so as to provide basic understanding in some aspects of the present disclosure. However, it is to be understood that this summary is not an exhaustive overview of the present disclosure. It is neither intended to identify key or critical parts of the present disclosure, nor intended to define the scope of the present disclosure. It merely functions to present some concepts of the present disclosure in a simplified form to be used as a prelude to a more detailed description stated later.

In view of this, an object of at least one aspect of the present disclosure is to provide a scheme for configuring an operation of a user equipment based on a height threshold, to optimize the communication performance.

According to an aspect of the present disclosure, a device in a wireless communication system is provided. The device includes processing circuitry configured to: configure operation of a user equipment based on one or more height thresholds for the user equipment and a current height of the user equipment directly or indirectly.

According to another aspect of the present disclosure, a device in a wireless communication system is provided. The device includes processing circuitry configured to: generate information directly or indirectly related to a current height of a user equipment, the information being to be sent to a base station for the base station to configure operation of the user equipment based on the information and one or more height thresholds for the user equipment.

According to another aspect of the present disclosure, a method in a wireless communication system is provided. The method includes: configuring operation of a user equipment based on one or more height thresholds for the user equipment and a current height of the user equipment directly or indirectly.

According to another aspect of the present disclosure, a method in a wireless communication system is provided. The method includes: generating information directly or indirectly related to a current height of a user equipment, the information being to be sent to a base station for the base station to configure operation of the user equipment based on the information and one or more height thresholds for the user equipment.

According to another aspect of the present disclosure, a computer readable storage medium having recorded thereon executable instructions for implementing the method according to the present disclosure described above, computer program codes and a computer program product for implementing the method according to the present disclosure described above are further provided.

According to at least one aspect of the embodiments of the present disclosure, a appropriate height threshold is set for a UAV communication scenario, the LTE-based UAV communication may be served well, such that various problems, such as an operation mode configuration and resource allocation, that may exist in the UAV communication scenario may be effectively solved and optimized.

According to another aspect of the embodiments of the present disclosure, operations on a user equipment can be configured based on a height threshold, such that the communication performance in the UAV communication scenario may be optimized.

According to another aspect of the embodiments of the present disclosure, the resource allocation is performed based on a height threshold, such that time-frequency resource allocation in a UAV communication scenario may be optimized, thereby improving the resource utilization and reducing the interference.

Other aspects of the embodiments of the present disclosure are given in the following description, in which the detailed description is used for fully disclosing, without limiting, preferred embodiments of the disclosed disclosure.

BRIEF DESCRIPTION OF THE DRAWINGS

The present disclosure may be understood better with reference to the detail description given in conjunction with the drawings in the following. The same or similar element is indicated by the same or similar reference numeral throughout all the drawings. The drawings together with the following detailed description are incorporated into and form a part of the specification and serve to further illustrate the preferred embodiments of the present disclosure and to explain the principle and advantages of the present disclosure by way of example. In the drawings.

DETAILED DESCRIPTION OF EMBODIMENTS

Figure 1:
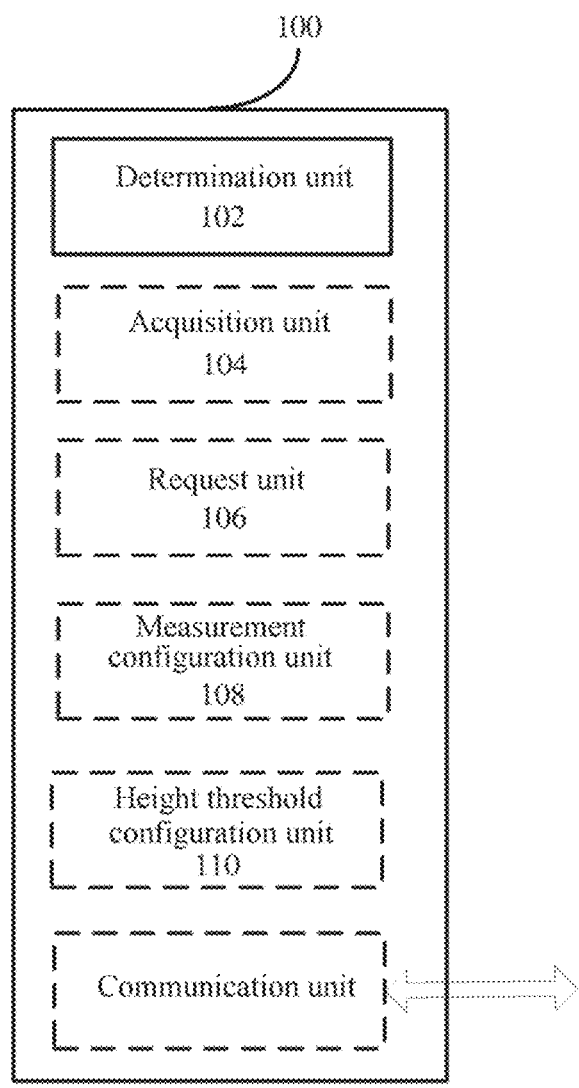
FIG. 1 is a block diagram showing a configuration example of a device at a base station side in a wireless communication system according to a first embodiment of the present disclosure.

Exemplary embodiments of the present disclosure will be described below in conjunction with the drawings. For the sake of clarity and conciseness, not all the features of practical embodiments are described in the specification. However, it is to be understood that numerous embodiment-specific decisions shall be made during developing any of such actual embodiments so as to achieve the developer's specific goals, for example, to comply with system-related and business-related constraining conditions which will vary from one embodiment to another. Furthermore, it is also to be understood that although the development work may be very complicated and time-consuming, for those skilled in the art benefiting from the present disclosure, such development work is only a routine task.

It is further to be noted here that, to avoid obscuring the present disclosure due to unnecessary details, only the apparatus structure and/or processing step closely related to the solution of the present disclosure are shown in the drawings, and other details less related to the present disclosure are omitted.

In the following, preferred embodiments of the present disclosure are described in detail in conjunction with FIGS. 1 to 43. Hereinafter, description is made in the following order.

1. First Embodiment (determination, configuration and update of a height threshold as well as identification and authentication on an unmanned aerial vehicle (UAV))

1-1. Configuration example at a base station side 1-2. Configuration example at a user equipment side 1-2-1. Configuration example of a device at an in-coverage (IC) user equipment side 1-2-2. Configuration Example of a device at an out-of-coverage (OOC) user equipment side 1-3. Configuration example at a core network side 1-4. Method Embodiment 2. Second Embodiment (operation mode configuration based on a height threshold)

2-1. Configuration example at a base station side 2-2. Configuration example at a user equipment side 2-3. Method Embodiment 3. Third Embodiment (resource allocation based on a height threshold)

3-1. Configuration example at a base station side 3-2. Configuration example at a user equipment side 3-2-1. Configuration example of a device at an in-coverage user equipment side 3-2-2. Configuration example of a device at an out-of-coverage user equipment side 3-3. Method Embodiment 4. Computing device for implementing embodiments of the device(s) and method(s) of the present disclosure 5. Application examples of the technology of the present disclosure Before describing the embodiments of the present disclosure in detail, it is to be noted that, in the following description, when referring to "a user equipment", it generally refers to a "UAV" or a terminal having UAV communication capability, unless explicitly stated that the user equipment is not a UAV or does not have the UAV communication capability. The "UAV communication capability" here refers to a capability of the UAV to get access to an LTE network for communication.

In addition, it is also to be noted that the mentioned "In Coverage (IC)" and "Out Of Coverage (OOC)" refer to cases where the user equipment is or is not within the coverage of the base station, that is, cases where there is or is not an effective connection between the user equipment and the base station or the connection quality can or cannot meet a communication requirement. If the user equipment is within the coverage of the base station, the user equipment is referred to as an "IC" user equipment, and if the user equipment is not within the coverage of the base station, the user equipment is referred to as an "OOC" user equipment. Whether the user equipment is within the coverage of the base station may be determined, for example, by detecting the energy of a synchronization signal, or may be determined by other means known in the art, which is not described in detail herein.

1. First Embodiment (Determination, Configuration and Update of a Height Threshold and Identification and Authentication on a UAV)

(1-1. Configuration Example at Abase Station Side)

FIG. 1 is a block diagram showing a configuration example of a device at a base station side in a wireless communication system according to a first embodiment of the present disclosure.

As shown in FIG. 1, a device 100 according to the embodiment may include a determination unit 102.

The determination unit 102 may be configured to determine one or more height thresholds for a user equipment based on at least one of base station related information, cell related information and user equipment related information.

It is to be noted that the height threshold herein may refer to a height relative to the ground or a height relative to a reference height, which is not limited in the present disclosure. In addition, it is also to be noted that in the following, when referring to "a height threshold", it refers to one or more height thresholds unless it is explicitly stated that only one height threshold is included.

Specifically, since different base stations may have different related information such as sizes, heights, positions, and the like, the same user equipment (that is, UAV) has different heights relative to different base stations, so that different height thresholds may be determined for user equipments in different base stations.

Figure 2A:
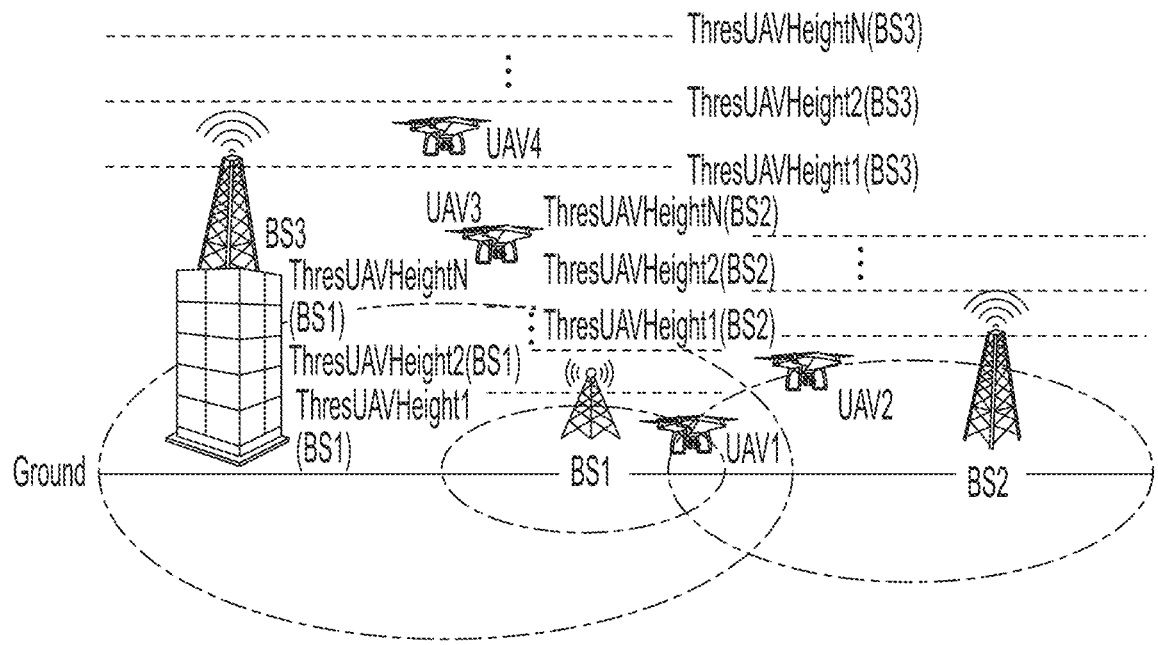
FIG. 2A is a schematic diagram showing an example scenario of setting one or more height thresholds based on base station related information according to an embodiment of the present disclosure.

FIG. 2A shows an example scenario in which one or more height thresholds are set based on base station related information according to an embodiment of the present disclosure.

As shown in FIG. 2A, a base station BS1 and a base station BS2 have different sizes and heights, so that height thresholds ThresUAVHeight1 (BS1) to ThresUAVHeightN (BS1) determined for a user equipment within coverage of the base station BS1 and height thresholds ThresUAVHeight1 (BS2) to ThresUAVHeightN (BS2) determined for a user equipment within coverage of the base station BS2 may be different in size, number, and/or interval between the height thresholds. On the other hand, although the base station BS2 and the base station BS3 have the same size, the base station BS2 and the base station BS3 may have different heights since the two base stations are in different positions (for example, the base station BS2 is located on the ground and the base station BS3 is located on a high building). Therefore, height thresholds ThresUAVHeight1 (BS2) to ThresUAVHeightN (BS2) determined for a user equipment within coverage of the base station BS2 and height thresholds ThresUAVHeight1 (BS3) to ThresUAVHeightN (BS3) determined for a user equipment within coverage of the base station BS3 may be different in size, number, and/or interval between the height thresholds.

On the other hand, the same base station may include multiple cells, and cell related information such as orientations, sizes, terrains, and intra-cell buildings of the cells may be different, so that the same user equipment may have different heights relative to different cells. Therefore, height thresholds determined for different user equipments in different cells may be different.

Figure 2B:
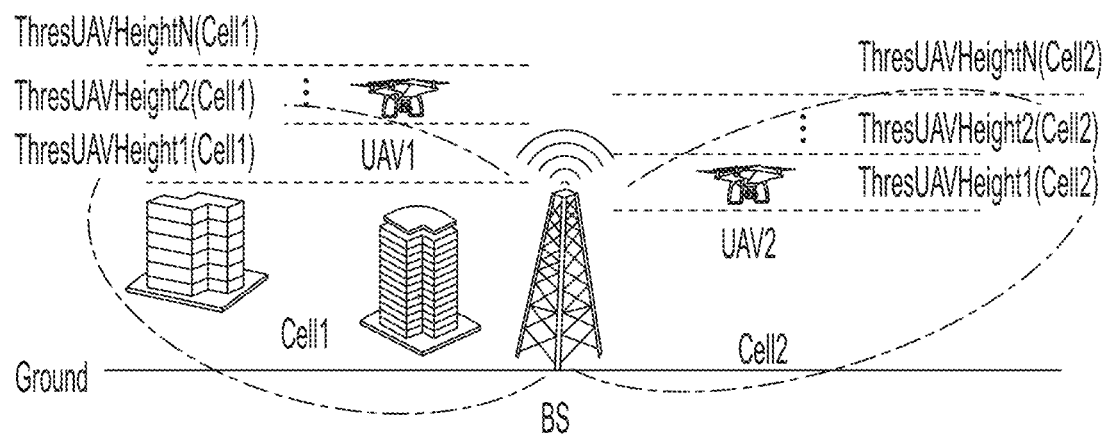
FIG. 2B is a schematic diagram showing an example scenario of setting a height threshold based on cell related information according to an embodiment of the present disclosure.

FIG. 2B shows an example scenario in which a height threshold is set based on cell related information according to an embodiment of the present disclosure.

As shown in FIG. 2B, a cell Cell1 and a cell Cell2 belong to the same base station. It can be seen that the two cells are different in size, terrain, and intra-cell building, so that height thresholds ThresUAVHeight1 (Cell1) to ThresUAVHeightN (Cell1) determined for a user equipment in the cell Cell1 and height thresholds ThresUAVHeight1 (Cell2) to ThresUAVHeightN (Cell2) determined for a user equipment in the cell Cell2 may be different in size, number, and/or interval between the height thresholds.

Furthermore, since different user equipments may have different user equipment related information such as different service lives, operating frequencies, transmission powers, and flight heights/speeds, the height thresholds determined for different user equipments in the same base station or in the same cell may also be different.

Figure 2C:
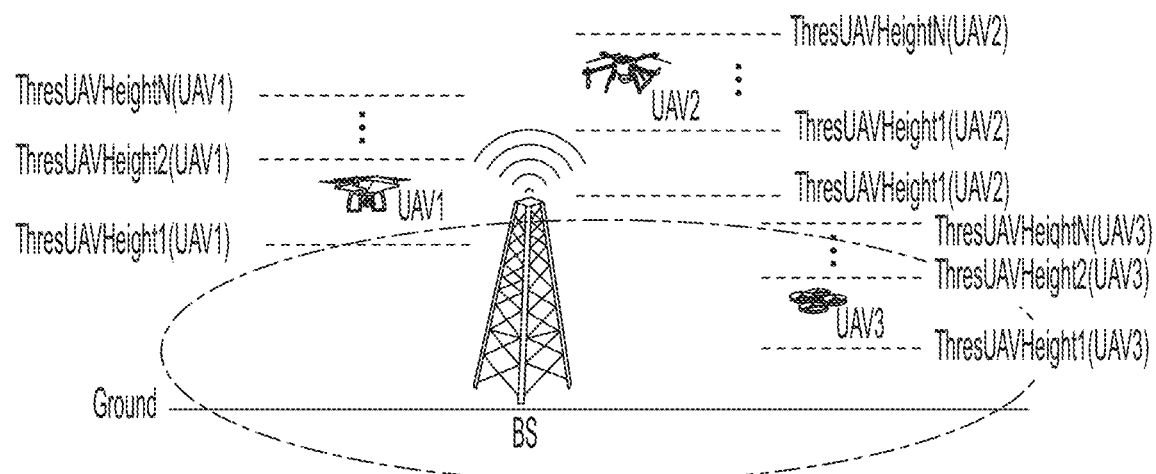
FIG. 2C is a schematic diagram showing an example scenario of setting a height threshold based on user equipment related information according to an embodiment of the present disclosure.

FIG. 2C shows an example scenario in which a height threshold is set based on user equipment related information according to an embodiment of the present disclosure.

As shown in FIG. 2C, user equipments UAV1, UAV2 and UAV3 are located in the same cell of the same base station, and the user equipments UAV1, UAV2 and UAV3 have different types, flight heights and speeds, and the like, so that height thresholds ThresUAVHeight1 (UAV1) to ThresUAVHeightN (UAV1) determined for the user equipment UAV1, height thresholds ThresUAVHeight1 (UAV2) to ThresUAVHeightN (UAV2) determined for the user equipment UAV2, and height thresholds ThresUAVHeight1 (UAV3) to ThresUAVHeightN (UAV3) determined for the user equipment UAV3 may be different in size, number, and/or interval between the height thresholds.

When determining a height threshold for a user equipment, it is required to consider not only information related to the user equipment itself, but also information related to other user equipment surrounding the user equipment, so as to determine the height threshold more reasonably. That is, the user equipment related information may include both information related to a target user equipment and information related to other user equipment surrounding the target user equipment. The user equipment related information may be information pre-stored at the base station side, information actively fed back by the user equipment, or information fed back in response to an inquiry (enquiry) from the base station. The user equipment related information may include, but is not limited to, capability information of the user equipment (for example, whether the user equipment has UAV communication capability, a maximum flight height and speed supported by the user equipment, and the like), communication parameters (for example, whether the user equipment supports multi-antenna transmission and reception, maximum transmission power, and the like), and the like. The two feedback manners are described in detail below.

Figure 3:
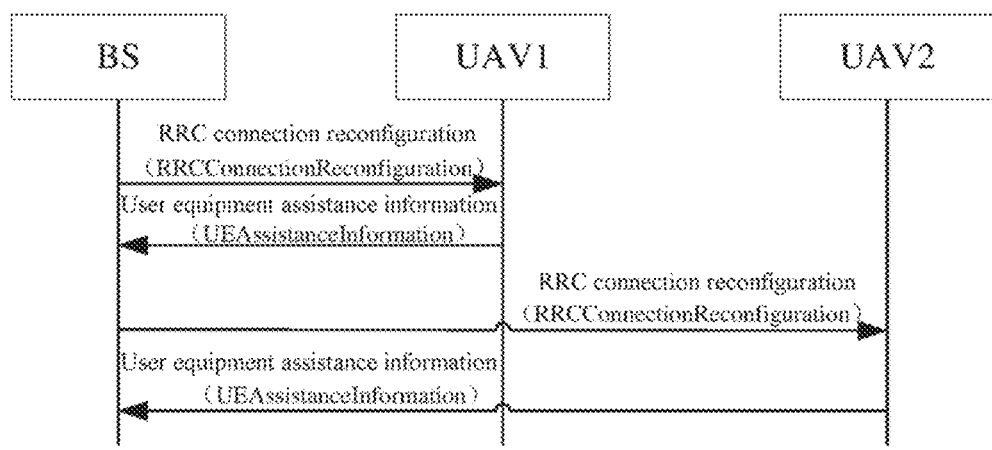
FIG. 3 is a flowchart showing a signaling interaction process in which a user equipment actively performs information feedback according to an embodiment of the present disclosure.

FIG. 3 is a flowchart showing a signaling interaction process in which a user equipment actively performs information feedback according to an embodiment of the present disclosure.

As shown in FIG. 3, the user equipments UAV1 and UAV2 each may include user equipment related information in, for example, user equipment assistance information (UEAssistanceInformation) signaling after receiving Radio Resource Control (RRC) connection reconfiguration signaling (RRCConnectionReconfiguration) from the base station BS, so as to feed it back to the base station.

In this case, preferably, the device 100 may further include an acquisition unit 104, which may be configured to acquire assistance information actively fed back by the user equipment as the user equipment related information. The assistance information may include, but is not limited to, one or more of capability information, a desired flight height and a desired flight speed of the user equipment.

Figure 4:
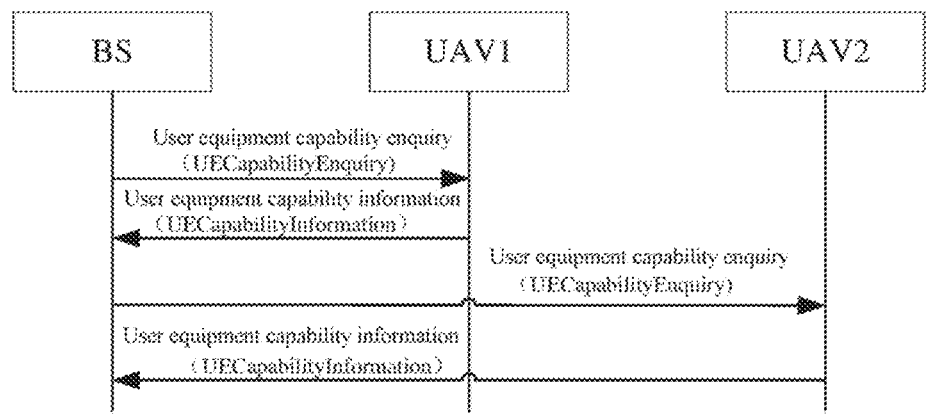
FIG. 4 is a flowchart showing a signaling interaction process in which a user equipment performs information feedback in response to an enquiry from a base station according to an embodiment of the present disclosure.

FIG. 4 is a flow diagram showing a signaling interaction process in which a user equipment performs information feedback in response to an enquiry from a base station according to an embodiment of the present disclosure.

As shown in FIG. 4, the base station BS may perform information enquiry to the user equipments UAV1 and UAV2 via, for example, user equipment capability enquiry (UECapabilityEnquiry) signaling and the user equipments UAV1 and UAV2 may each include the user equipment related information including capability information, communication parameters and the like in user equipment capability information (UECapabilityInformation) signaling after receiving the enquiry, so as to feed it back to the base station. Specifically, for example, the base station may enquire, in the UECapabilityEnquiry signaling, whether the user equipment supports Evolved Universal Terrestrial Radio Access (E-UTRA). When feeding back the UECapabilityInformation signaling to the base station, the user equipments UAV1 and UAV2 may each provide the feedback by modifying existing information elements or fields in the UECapabilityInformation signaling, or indicate that the user equipment has the UAV Communication capability such as the supported maximum movement speed and flight height by adding a new information element or field in the ue-CapabilityRAT-Container→UE-EUTRA-CapabilityIE.

In this case, preferably, the device 100 may further include a request unit 106, which may be configured to generate a capability enquiry request for the user equipment to obtain capability information fed back by the user equipment in response to the capability enquiry request as the user equipment related information.

It is to be noted that the signaling interaction processes for feeding back the user equipment related information described above with reference to FIGS. 3 and 4 are merely examples given for explaining the principles of the present disclosure, in which processes not related to the technology of the present disclosure are omitted. Those skilled in the art may also modify the interaction processes according to actual needs. For example, information enquiry and feedback and the like may be performed via other signaling than the above signaling.

In addition, preferably, in addition to the fed back assistance information or capability information, the user equipment may feed back category information indicating a device category of the user equipment as the user equipment related information to the base station actively or in response to the enquiry from the base station. Specifically, a new device category of the user equipment (UECategory 13) may be defined for the UAV, which may be performed by adding a parameter UECategory 13 in a downlink physical layer parameter and an uplink physical layer parameter set by a field UE-Category, so that the device 100 at the base station side may acquire the user equipment related information, including capability information, communication parameters, and the like, according to the received category information indicating the device category.

According to the above description, the height threshold determined for the user equipment may be specific to a base station (BS-specific), to a cell (Cell-specific) or to a user equipment (UE-specific). In other words, for different base stations and/or cells or for the same base station and/or cell, the same user equipment may have the same or different height thresholds, and different user equipments may have the same or different height thresholds.

In practice, according to a specific application scenario, a height threshold for the user equipment may be determined based on one or more of the above three factors (that is, base station related information, cell related information, and user equipment related information).

In addition, in addition to the above factors, in a case that the UAV is in flight, and information such as a flight height, a flight status, and surrounding environment of the UAV is dynamically changed, it is preferable that these dynamic changes are considered when determining the height threshold, which requires the user equipment to perform measurement and reporting.

Referring back to FIG. 1, preferably, the device 100 may further include a measurement configuration unit 108, which may be configured to generate measurement configuration information for a target user equipment and/or other user equipment, so that the target user equipment and/or the other user equipment perform measurement and reporting periodically, non-periodically or based on event triggering (for example, when a handover occurs, when a traditional measurement report event A1 or A2 occurs, in a case that current configuration information cannot meet a communication performance request of the user equipment, or in a case that a change of the flight height of the user equipment is beyond a predetermined threshold) according to the measurement configuration information. When configuring a height threshold for any user equipment, only a measurement report result from the user equipment itself may be considered, or only a measurement report result from one or more other user equipments may be considered, or the measurement report results from the above two types of user equipments may be considered together.

The measurement configuration information may be transmitted, for example, by an RRC layer signaling measurement configuration (MeasConfig), and as a response, the user equipment may include its measurement report result in a signaling measurement report (MeasurementReport). More specifically, the user equipment may include its measurement report result in a measurement result (MeasResults) of the signaling.

In another implementation, instead of instructing the user equipment to perform measurement and reporting by using the above RRC layer signaling MeasConfig, the base station may also instruct, by using MAC layer signaling, the user equipment to perform measurement and reporting. Specifically, for example, the base station may instruct the user equipment to perform measurement and reporting by using a newly added MAC control element (MAC CE), so that the user equipment receiving the instruction may report its measurement result (including information of a current height and the like) through the corresponding newly added MAC CE.

Alternatively, in another implementation, the base station may also instruct, by using physical layer signaling, the user equipment to perform measurement and reporting. Specifically, for example, the base station may instruct the user equipment to perform measurement and reporting by modifying existing downlink control information (DCI) or newly defining DCI, and the information may be transmitted in a physical downlink control channel (PDCCH). Correspondingly, the user equipment receiving the instruction may modify existing uplink control information (UCI) or newly defining UCI to carry its measurement result (including information of a current height, and the like), and the information may be transmitted in a physical uplink control channel (PUCCH).

It is to be noted that although examples of instructing the user equipment to perform measurement and reporting by using physical layer signaling, MAC layer signaling, and RRC layer signaling, it is to be understood that the user equipment may be instructed to perform measurement and reporting by using the above signaling in a combined manner or by using other signaling than the above signaling.

The determination unit 102 may determine and/or update the height threshold for the target user equipment based on the measurement report result(s) from the target user equipment and/or the other user equipment. The measurement report result includes, but is not limited to, one or more of position information, height information, speed information, and electric quantity information of the user equipment, and a measurement result for a neighboring cell.

In addition, preferably, the determination unit 102 may also determine and/or update the height threshold according to information of an environment in which the user equipment is currently located. For example, in different areas (for example, urban areas, suburbs), environmental information such as distribution densities of UAVs, base stations, other types of user equipments, buildings, and the like, as well as terrain factors, and path losses are often different, and thus the height threshold for the user equipment may be further optimized by taking such environmental information into consideration.

On the other hand, since the flight height of the UAV is relatively high and there may be the LoS between the UAV and multiple base stations, the height threshold for an optimized equipment may be further optimized by taking interaction between the base stations into consideration, which is especially advantageous for a case that the user equipment is at an edge of a cell. An embodiment in this case is described below with reference to FIGS. 5 and 6.

Figure 5:
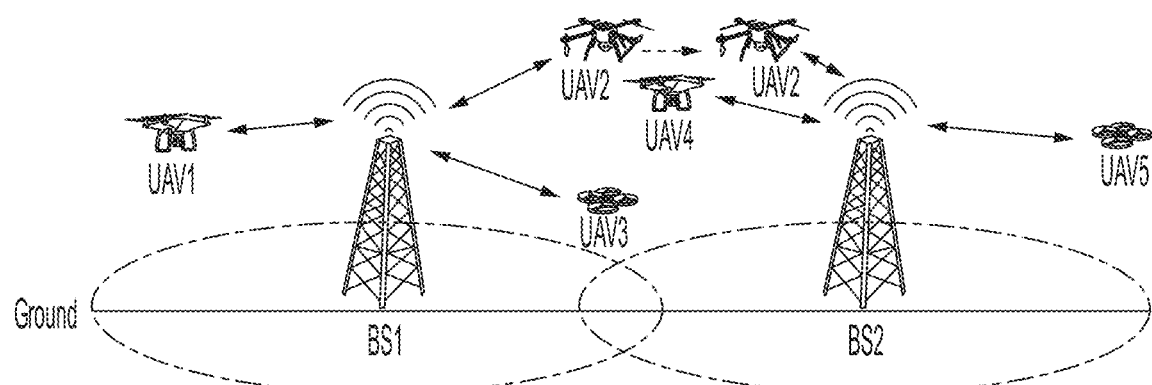
FIG. 5 is a schematic diagram showing an example of a communication scenario according to an embodiment of the present disclosure.

FIG. 5 is a schematic diagram showing an example of a communication scenario according to an embodiment of the present disclosure.

As shown in FIG. 5, the user equipments UAV2 and UAV4 are respectively connected to the base stations BS1 and BS2, and are each located at an edge of a cell. In this case, when the base station BS1 and the base station BS2 determine the height thresholds for the respective user equipments UAV2 and UAV4, information interaction may be performed first to optimize determination and/or update of the height threshold. Thus, in a case that user equipment UAV2 and UAV4 use resources associated with their respective height thresholds, interference may be effectively avoided.

Figure 6:
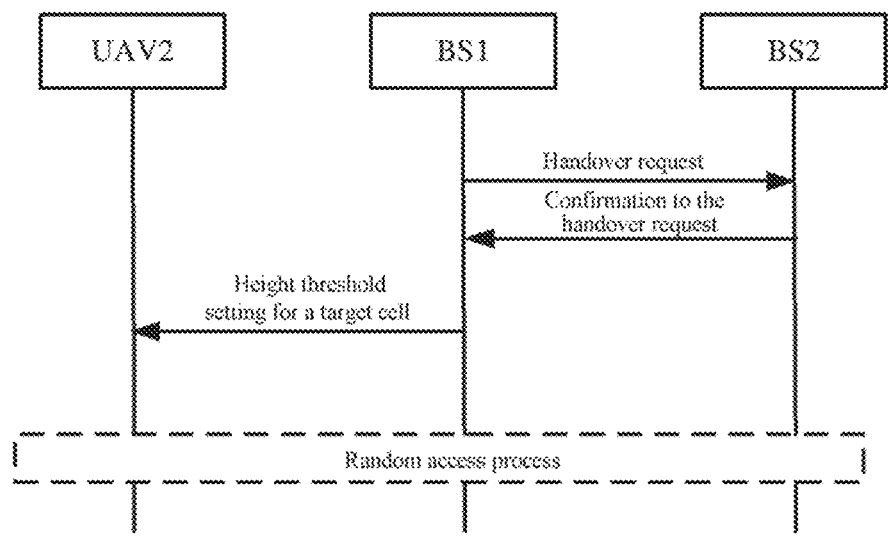
FIG. 6 is a flowchart showing a signaling interaction process in a case of a handover according to an embodiment of the present disclosure.

On the other hand, information interaction between the base stations is also advantageous for a handover process. As shown in FIG. 5, the user equipment UAV2 flies from the base station BS1 to the base station BS2, so that a handover from a source cell to a target cell needs to be performed. In this case, if the base station BS1 transmits the height threshold setting information of the target cell obtained via information interaction to the user equipment UAV2 in advance, a time delay for the handover can be reduced, a failed handover can be avoided, and the interference can be reduced. FIG. 6 shows a signaling interaction process in this case.

As shown in FIG. 6, after receiving a handover request from the base station BS1, the base station BS2 includes a height threshold setting in its cell in a confirmation message for the handover request and transmits it to the base station BS1. Through such information interaction, the base station BS1 may transmit the obtained height threshold to the user equipment UAV2, so that the user equipment UAV2 may handover to the target cell by performing a random access process according to the received height threshold setting for the target cell.

It is to be understood that the signaling interaction process shown in FIG. 6 is merely an example given to explain the principles of the present disclosure, and signaling and descriptions that are not related to the technology of the present disclosure are omitted to avoid blurring, and it does not represent a complete actual handover process.

The factors that need to be considered when determining a height threshold for the user equipment are described above, but it is to be understood that this is only exemplary rather than restrictive. In practice, one or more of the above factors may be considered in combination with other factors than the above factors according to an actual application scenario to make reasonable determination and update. For example, information interaction between user equipments and the like may also be considered.

Referring back to FIG. 1, preferably, the device 100 may further include a height threshold configuration unit 110, which may be configured to generate configuration information including the determined one or more height thresholds. The configuration information is to be transmitted to the user equipment for the user equipment to apply related operations based on the height thresholds.

Figure 7:
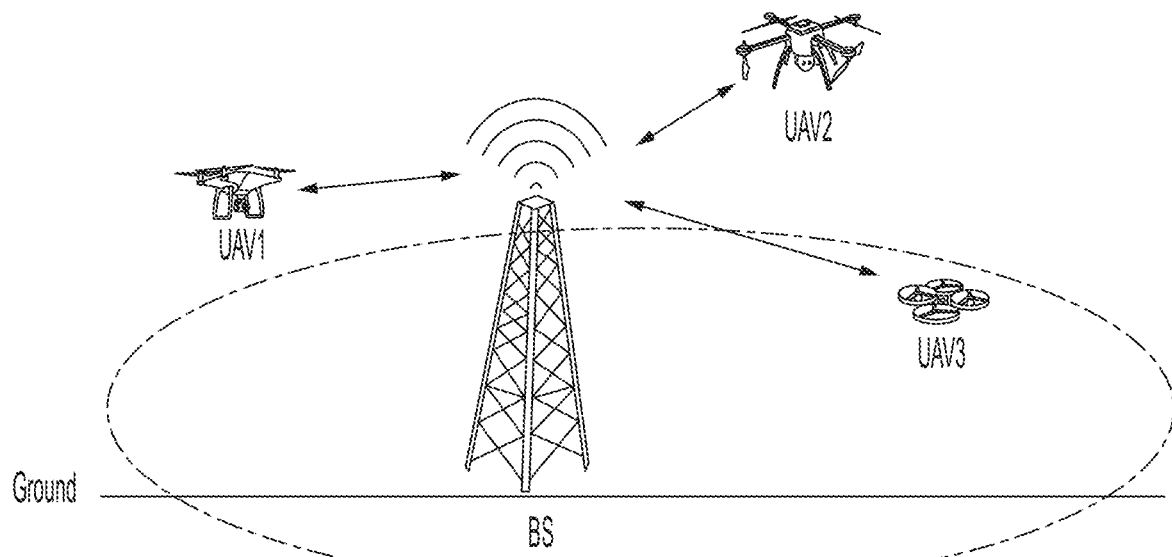
FIG. 7 is a schematic diagram showing an example of a scenario in which a base station transmits configuration information of a height threshold to an in-coverage user equipment.

FIG. 7 is a schematic diagram showing an example of a scenario in which a base station transmits configuration information of a height threshold to an in-coverage user equipment. As shown in FIG. 7, there are three user equipments UAV1, UAV2, and UAV3 within the coverage of the base station BS, so that the base station may include the generated configuration information of the height thresholds in physical layer signaling, MAC layer signaling, or RRC signaling and transmit it to each user equipment. The configuration of the height threshold using the three types of signaling is described in detail below.

The physical layer signaling may be information carried by a physical downlink control channel (PDCCH), such as downlink control information (DCI). Specifically, the configuration information may be carried by modifying (for example, adding an index to) an existing DCI format, or a newly defining DCI format. The newly defined DCI format may be specific to UAVs or may not be specific to UAVs. The height threshold may be indicated by an index in the newly defined DCI format. Table 1 shows an example of a method of indicating a height threshold using an index (which may include one or more bits) in the DCI format. In this example, the index includes two bits, so that four different height threshold settings may be indicated. It may be understood that a greater number of different height threshold settings may be indicated depending on the number of bits of the index.

TABLE 1

| Index | Height threshold |
| --- | --- |
| 00 | ThresUAVHeight = {ThresUAVHeight1} |
| 01 | ThresUAVHeight = {ThresUAVHeight1, ThresUAVHeight2} |
| 11 | ThresUAVHeight = {ThresUAVHeight1, ThresUAVHeight2, ThresUAVHeight3} |
| 10 | ThresUAVHeight = {ThresUAVHeight1, ThresUAVHeight2, . . . , ThresUAVHeightN} |

The MAC signaling may include a MAC control element (MAC CE). Specifically, the height threshold may be configured by using the newly added MAC CE. That is, one logical channel ID (LCID) is selected from the currently reserved LCIDs to indicate the newly added MAC CE, and a field with a fixed length of one byte (8 bit) is set in the newly added MAC CE to indicate different height threshold settings. The specific configuration is similar to that in the above Table 1, and is not described in detail here.

The RRC signaling may include a system broadcast message, an RRC connection setup message (RRCConnectionSetup), or an RRC connection reconfiguration message (RRCConnectionReconfiguration).

Specifically, configuration information regarding the height threshold may be included in the existing system broadcast message. The system broadcast message may be broadcast periodically to prevent, for example, newly joined user equipment from failing to receive the configuration information. For example, a corresponding information element may be added to the RACH-ConfigCommon of a system information block of a type SIB2 to indicate the height threshold. Alternatively, the height threshold may be configured by using a system information block of another existing type or a system information block of another type that may appear in the future, which is not specifically limited here. This configuration is particularly suitable for a case where the determined height threshold is base station-specific or cell-specific, which may reduce the signaling overhead.

As an application example, preamble and physical random access channel (PRACH) resources may be associated with a height threshold. For example, if a current height of the UAV is greater than a certain height threshold, a set of specific preamble and PRACH resources are used for random access. If the current height is lower than a certain height threshold, traditional preamble and PRACH resources are used for random access. In this way, after receiving the configuration information regarding the height threshold from the base station, the UAV measures its current flight height (for example, by GPS positioning) to select appropriate preamble and PRACH resources, thereby improving the rate of successful random access and avoiding access conflicts.

Figure 8:
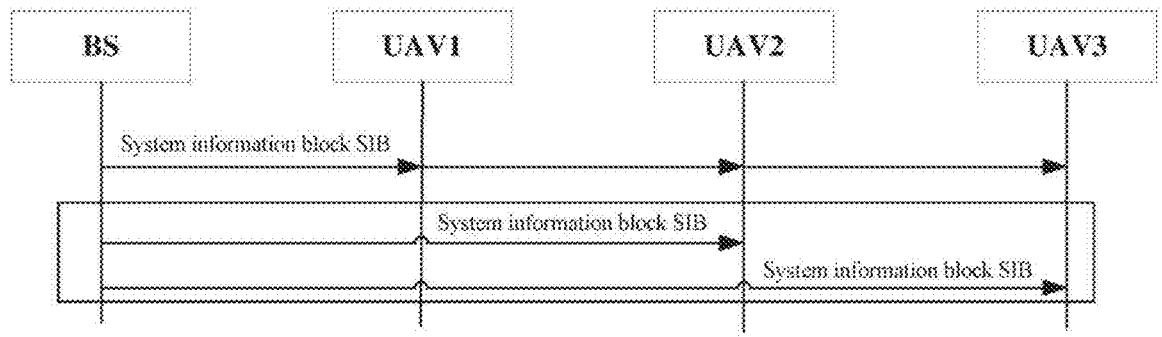
FIG. 8 is a flow chart showing an example of a signaling interaction process for configuring a height threshold by using a system broadcast message.

FIG. 8 is a flow chart showing an example of a signaling interaction process for configuring a height threshold by using a system broadcast message.

As shown in FIG. 8, the base station BS shown in FIG. 7 transmits configuration information regarding the determined height threshold to the user equipments UAV1, UAV2, and UAV3 by using, for example, a system information block (SIB) of any type. The configuration information may reach the user equipments at the same time or may also reach the user equipments at different times (as indicated by the dashed box in FIG. 8).

On the other hand, considering that the height of the UAV before being taken-off is similar to the height of an ordinary user equipment on the ground, the configuration information regarding the height threshold may also be transmitted to the UAV by using the RRC connection setup (RRCConnectionSetup) message. That is, the base station may transmit the configuration information regarding the height threshold to the UAV by using the RRCConnectionSetup message in the last step of the random access process of the UAV.

As an application example, after obtaining its own height threshold by using the RRCConnectionSetup message from the base station, the UAV may select a corresponding time-frequency resource to communicate with the base station according to a correspondence between the height threshold and the time-frequency resource.

Figure 9:
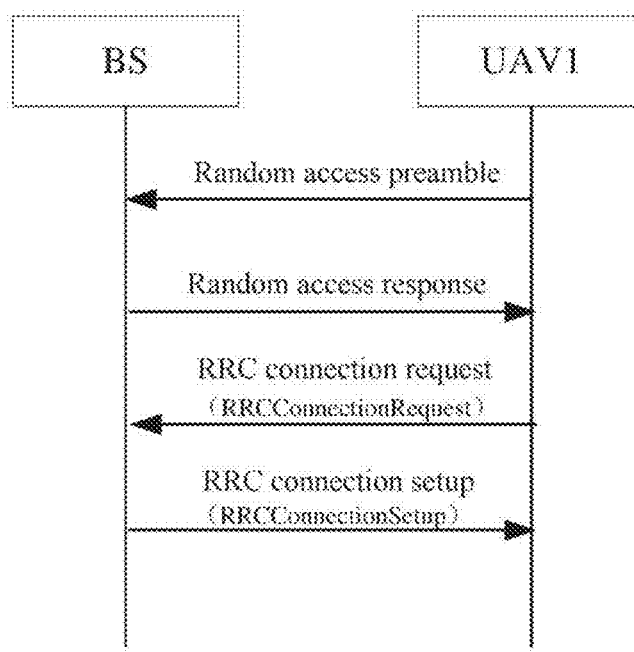
FIG. 9 is a flow chart showing an example of a signaling interaction process for configuring a height threshold by using an RRC connection setup message.

FIG. 9 is a flow chart showing an example of a signaling interaction process for configuring a height threshold by using an RRC connection setup message.

In FIG. 9, a method for configuring a height threshold in a random access process is shown by taken the user equipment UAV1 as an example, which is also applicable to the user equipments UAV2 and UAV3. In addition, it is to be noted that the random access process is not limited to, for example, a random access process when the user equipment is powered on, but may be a random access process in any case of, for example, handover or asynchronization. As shown in FIG. 9, the user equipment UAV1 transmits a random access preamble to the base station BS, and transmits an RRC connection request (RRCConnectionRequest) to the base station after receiving the random access response from the base station BS, so that after receiving the request, the base station BS includes the configuration information regarding the height threshold in the RRC connection setup (RRCConnectionSetup) message and transmit it to the user equipment UAV1.

On the other hand, considering that the height of the UAV before being taken-off is similar to a height of an ordinary user equipment on the ground, the configuration information regarding the height threshold may also be transmitted to the UAV by using the RRC connection reconfiguration message (RRCConnectionReconfiguration). That is, after the UAV setup a connection with the base station, the base station may transmit a configuration message regarding the height threshold to the UAV by using the RRCConnectionReconfiguration message.

In an application, after obtaining the configuration information regarding the height threshold according to the received RRCConnectionReconfiguration message, the UAV may select a corresponding time-frequency resource according to a correspondence between the height threshold and the time-frequency resource, to communicate with the base station. Preferably, in a case that the height of the UAV is relatively low, the height threshold may not be configured for the UAV, Rather, the configuration information regarding the height threshold is transmitted to the user equipment by using the RRCConnectionReconfiguration message in a case that the base station determines that a current height reported by the user equipment is higher than a specific height threshold (for example, a smallest height threshold in the one or more height thresholds).

It is to be noted that, as described above, the height threshold for the UAV may be dynamically updated according to environmental information, measurement report information of the user equipment, interaction between the base stations, and the like, and thus configuration information regarding the updated height threshold may be notified to the UAV by using the RRCConnectionReconfiguration message.

Figure 10:
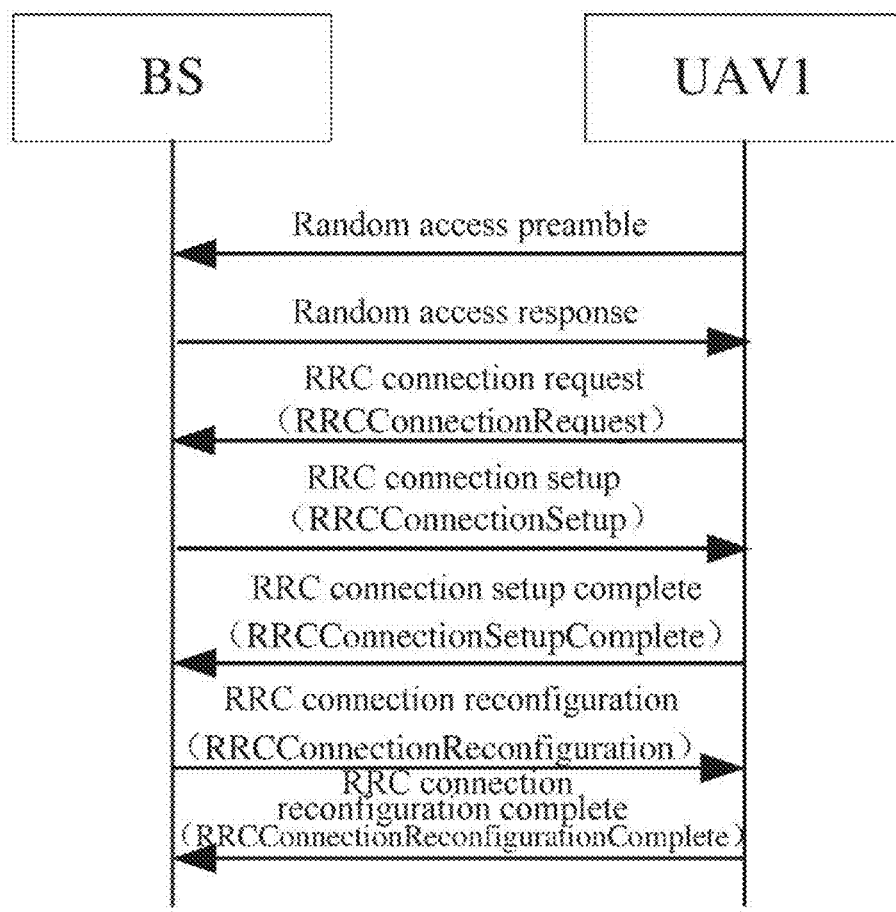
FIG. 10 is a flowchart showing an example of a signaling interaction process for configuring a height threshold by using an RRC connection reconfiguration message.

FIG. 10 is a flow chart showing an example of a signaling interaction process for configuring a height threshold by using an RRC Connection Reconfiguration message.

The flowchart shown in FIG. 10 is different from the flowchart shown in FIG. 9 in that, in FIG. 10, after receiving an RRC connection setup complete message (RRCConnectionSetupComplete) from the user equipment UAV1, the base station BS transmits the configuration information regarding the height threshold to the user equipment UAV1 by using the RRCConnectionReconfiguration message; and after successfully receiving the RRCConnectionReconfiguration message, the user equipment UAV1 feeds back the RRC connection reconfiguration complete (RRCConnectionReconfigurationComplete) message to the base station BS to indicate that the RRC connection reconfiguration process is completed.

It is to be understood that the signaling interaction processes shown in FIGS. 8 to 10 in which the configuration information regarding the height threshold is notified by using the RRC layer signaling are only examples, in which the illustration and description not related to the technology of the present disclosure are omitted to avoid blurring, and those skilled in the art may appropriately modify the above-described signaling interaction processes according to actual conditions, and all of such modifications should be considered to fall within the scope of the present disclosure.

Furthermore, it is to be noted that although examples of notifying the configuration information regarding a height threshold by using the physical layer signaling, the MAC layer signaling, and the RRC layer signaling are described above, it is to be understood that the configuration information regarding a height threshold may also be notified by using the above signaling in a combined manner or by using other signaling than the above signaling.

The process of determination, configuration, and update of one or more height thresholds for a user equipment is described above, but it is to be understood that this is performed by assuming that the user equipment is a UAV (or has UAV communication capability) and is allowed to access a current network. The base station does not need to configure a height threshold for a user equipment that does not have the UAV communication capability or is not allowed to access the current network. Therefore, in fact, before configuring the height threshold for the user equipment, the user equipment is to be identified (that is, to confirm whether the user equipment has the UAV communication capability) and authenticated (that is, to confirm whether the user equipment is allowed to access the current network). This embodiment is described in detail below with reference to FIG. 11.

Figure 11:
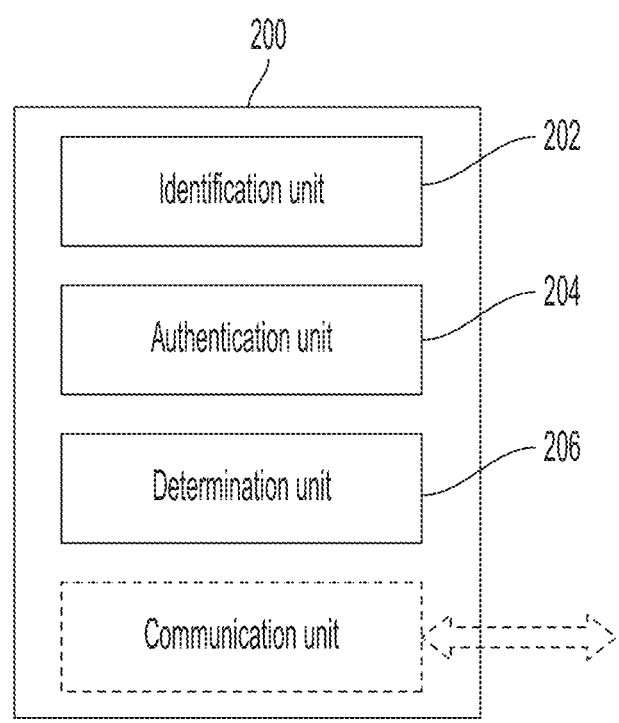
FIG. 11 is a block diagram showing another configuration example of the device at a base station side in a wireless communication system according to the first embodiment of the present disclosure.

FIG. 11 is a block diagram showing another configuration example of the device at a base station side in a wireless communication system according to the first embodiment of the present disclosure.

As shown in FIG. 11, a device 200 according to the embodiment includes an identification unit 202, an authentication unit 204, and a determination unit 206. The functional configuration example of the determination unit 206 is substantially the same as that of the determination unit 102 described above with reference to FIGS. 1 and 10, and is not repeated here. Only functional configuration examples of the identification unit 202 and the authentication unit 204 are described in detail below.

The identification unit 202 may be configured to determine whether the user equipment has the UAV communication capability according to user equipment related information from the user equipment. The description to the user equipment related information (including an acquiring process, the included information, and the like) may be referred to the description at a corresponding part above, for example, UEAssistanceInformation and UECapabilityInformation or UECategory 13 described with reference to FIG. 3 and FIG. 4, which is not repeated here.

The authentication unit 204 may be configured to request a core network equipment (for example, a mobility management entity (MME) and/or a home subscriber server (HSS) to confirm whether the user equipment is allowed to use the current network legally in a case that it is determined that the user equipment has the UAV communication capability.

Specifically, for example, the authentication process may be performed in an attach procedure of the user equipment. The authentication process is described in detail below with reference to the flowchart shown in FIG. 12.

Figure 12:
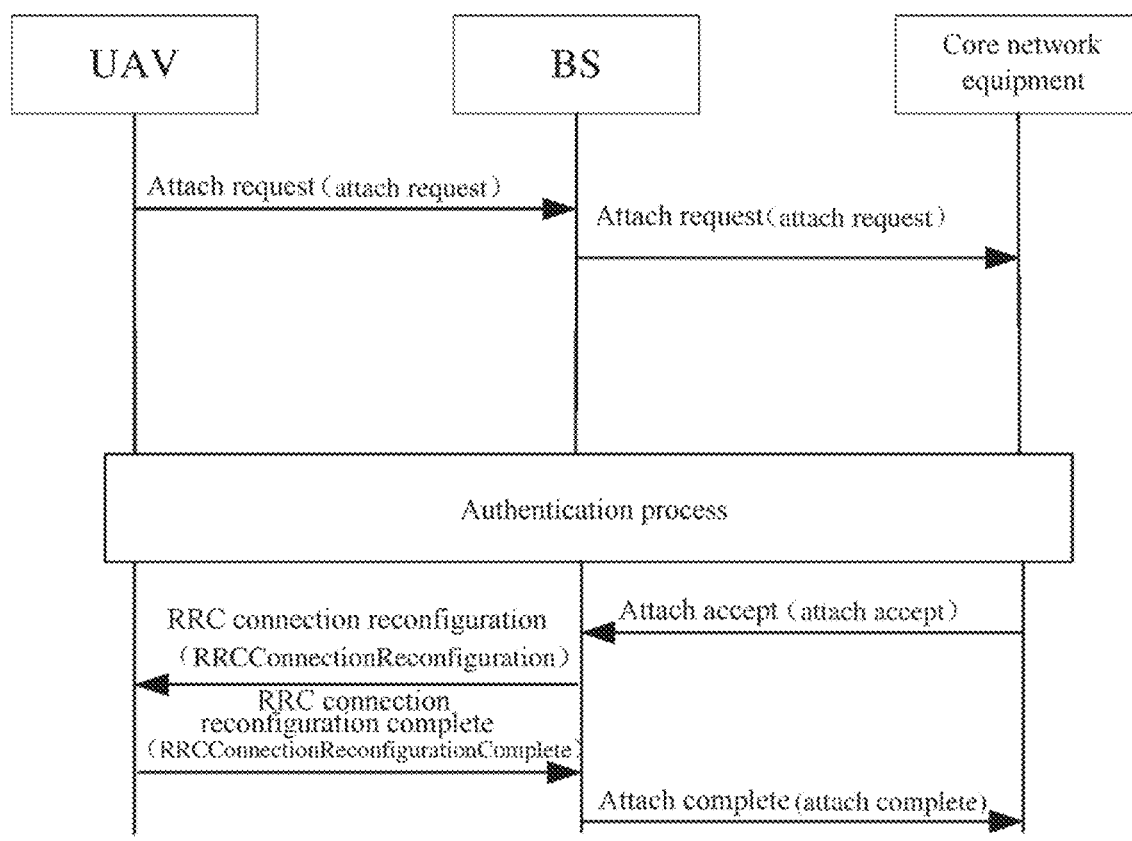
FIG. 12 is a flowchart showing an example of a signaling interaction process of an authentication process according to an embodiment of the present disclosure.

FIG. 12 is a flowchart showing an example of a signaling interaction process of an authentication process according to an embodiment of the present disclosure.

As shown in FIG. 12, for the user equipment UAV that is determined to have the UAV communication capability, the base station BS forwards, after receiving the attach request of the user equipment (including the identity information of the user equipment, for example, the international mobile equipment identity, IMEI), the attach request to the core network equipment. The core network equipment authenticates the user equipment according to the identity information of the user equipment included in the attach request, that is, confirming whether the user equipment is allowed to use the current network legally.

After confirming the identity information of the user equipment, the core network equipment transmits an attach accept message to the base station BS to indicate that the user equipment is allowed to use the current network legally. After receiving this confirmation message, the base station BS transmits an RRCConnectionReconfiguration message to the user equipment UAV to inform the user equipment UAV of allowance of attachment. Preferably, as described above, the RRCConnectionReconfiguration message may also include the configuration information regarding a height threshold for the user equipment.

After successfully receiving the RRCConnectionReconfiguration message, the user equipment UAV feeds back an RRCConnectionReconfigurationComplete message to the base station, so that the base station transmits an attach complete message to the core network equipment to indicate that the attach procedure of the user equipment UAV is completed.

It is to be understood that the signaling interaction process for authenticating the user equipment by the attach procedure described herein with reference to FIG. 12 is only given to explain the principles of the present disclosure and does not constitute any limitation, and those skilled in the art may also authenticate the user equipment by other suitable processes, to confirm whether the user equipment is allowed to access the current network legally.

It is to be noted that the various functional units described above with reference to FIGS. 1 and 11 are merely logical modules divided according to the specific functions thereof, and are not intended to limit the specific implementations. In the actual implementation, the functional units and modules may be implemented as separated physical entities, or may be implemented by a single entity (for example, a processor (CPU, DSP or the like), an integrated circuit or the like).

In addition, it is to be noted that the devices 100 described above with reference to FIG. 1 and the device 200 described above with reference to FIG. 11 may be implemented at a chip level, or may be implemented at a device level by including other peripheral components. For example, the devices 100 and 200 may also operate as the base station itself, and may also include a communication unit (which is optional and indicated by a dashed box) for performing communication. For example, the communication unit may be used to perform communication with the user equipment, communication with other base station, communication with the core network equipment, and the like. In addition, it is further to be noted that the specific implementation of the communication unit is not limited here, and it may include one or more communication interface(s) for realizing communication with different external devices.

(1-2. Configuration Example at a User Equipment Side)

Corresponding to the configuration example at a base station side described above, a configuration example at a user equipment side is described below.

The base station may determine, configure, and update the height threshold for the user equipment only in a case that the user equipment is located within the coverage of the base station. The base station cannot directly determine, configure, or update the height threshold for the user equipment in a case that the user equipment is located outside the coverage of the base station. Therefore, in the following description, configuration examples for an in-coverage user equipment and an out-of-coverage user equipment are described separately.

(1-2-1. Configuration Example of an In-Coverage User Equipment)

A configuration example of the in-coverage user equipment is described in detail below with reference to FIG. 13, which is a block diagram showing a configuration example of a device at a user equipment side in a wireless communication system according to the first embodiment of the present disclosure.

Figure 13:
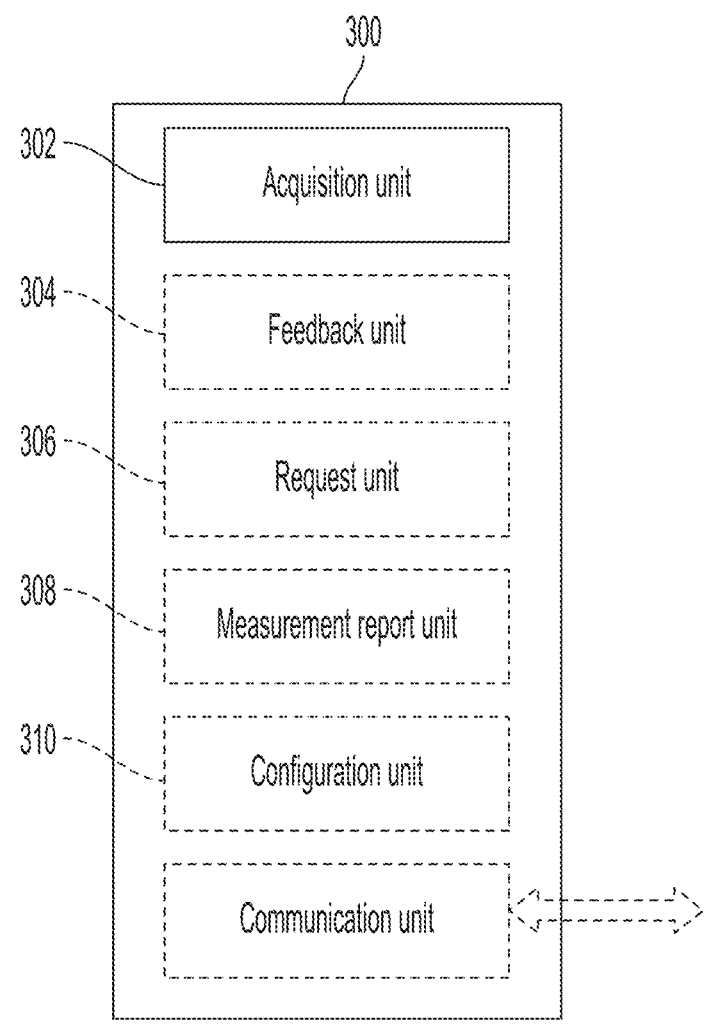
FIG. 13 is a block diagram showing a configuration example of a device at a user equipment side in a wireless communication system according to the first embodiment of the present disclosure.

As shown in FIG. 13, a device 300 according to the embodiment may include an acquisition unit 302. The acquisition unit 302 may be configured to acquire one or more height thresholds for a user equipment in which the device 300 is located based on configuration information from a base station. The one or more height thresholds are determined by the base station based on at least one of base station related information, cell related information, and user equipment related information.

Specifically, for example, the acquisition unit 302 may acquire height threshold information for the user equipment according to an indication of related information element or field in physical layer signaling (for example, DCI), MAC layer signaling (for example, MAC CE), or RRC layer signaling (for example, SIB, RRCConnectionSetup, or RRCConnectionReconfiguration) from the base station. Specifically, description of acquiring the height threshold information according to the information element or the field in the corresponding signaling may be referred to the description at a corresponding part in the embodiment of the base station side, which is not repeated here.

Preferably, the device 300 may further include a feedback unit 304. The feedback unit 304 may be configured to feed back the user equipment related information actively or in response to an enquiry from the base station for the base station to determine one or more height thresholds for the user equipment and/or determine whether the user equipment has the UAV communication capability (that is, authenticate the user equipment) before determining the height thresholds.

As an example, the feedback unit 304 may actively feedback assistance information related to the user equipment (including but not limited to capability information, communication parameters, and the like) to the base station by using, for example, the UEAssistanceInformation message described above. As another example, the feedback unit 304 may feedback its capability information, communication parameters, and the like to the base station by using the UECapabilityInformation in response to the capability enquiry request (UECapabilityEnquiry) from the base station. As yet another example, the feedback unit 304 may feedback category information indicating the device category of the user equipment (for example, the above UEcategory 13) to the base station actively or in response to an enquiry from the base station. The feedback information may serve as user equipment related information for the base station to determine the height threshold and/or to identify the user equipment. For a specific feedback process, reference may be made to the description at the corresponding part in the above embodiment of the base station side, which is not repeated here.

Preferably, the device 300 may further include a request unit 306, which may be configured to issue a request (for example, the attach request in the attach procedure, which may include the identity information of the user equipment) to the base station in a case that the base station determines that the user equipment has the UAV communication capability according to the related information fed back by the feedback unit 304, so that after receiving the request, the base station in turn requests the core network equipment to confirm whether the user equipment is allowed to use the current network legally (that is, authenticate the user equipment). In a case that the core network equipment confirms the legal identity of the user equipment (that is, the user equipment is allowed to use the current network legally), the device 300 may perform an attaching operation to the current network. For a specific authentication process, reference may be made to the description at the corresponding part in the above embodiment of the base station side, which is not repeated here.

Preferably, the device 300 may further include a measurement report unit 308, which may be configured to perform measurement and reporting periodically, non-periodically, or based on event triggering according to measurement configuration information from the base station, for the base station to determine and/or update the height threshold according to a measurement report result. The measurement report result may be carried in the MeasurementReport as the RRC layer signaling, the newly added MAC CE as the MAC layer signaling, and/or the UCI as the physical layer signaling to be reported to the base station. For the process of performing measurement and reporting based on the measurement configuration information, reference may be made to the description at the corresponding part in the above embodiment of the base station side, which is not repeated here.

Moreover, preferably, in some cases, if there is a connection between an in-coverage user equipment and an out-of-coverage user equipment, the in-coverage user equipment may assist in determining a height threshold for a remote user equipment (that is, the out-of-coverage user equipment) or relay configuration information regarding the height threshold from the base station to the remote user equipment. An embodiment in this case is described below in conjunction with the example of a communication scenario shown in FIG. 14, which is a schematic diagram showing another example of a communication scenario according to an embodiment of the present disclosure.

Figure 14:
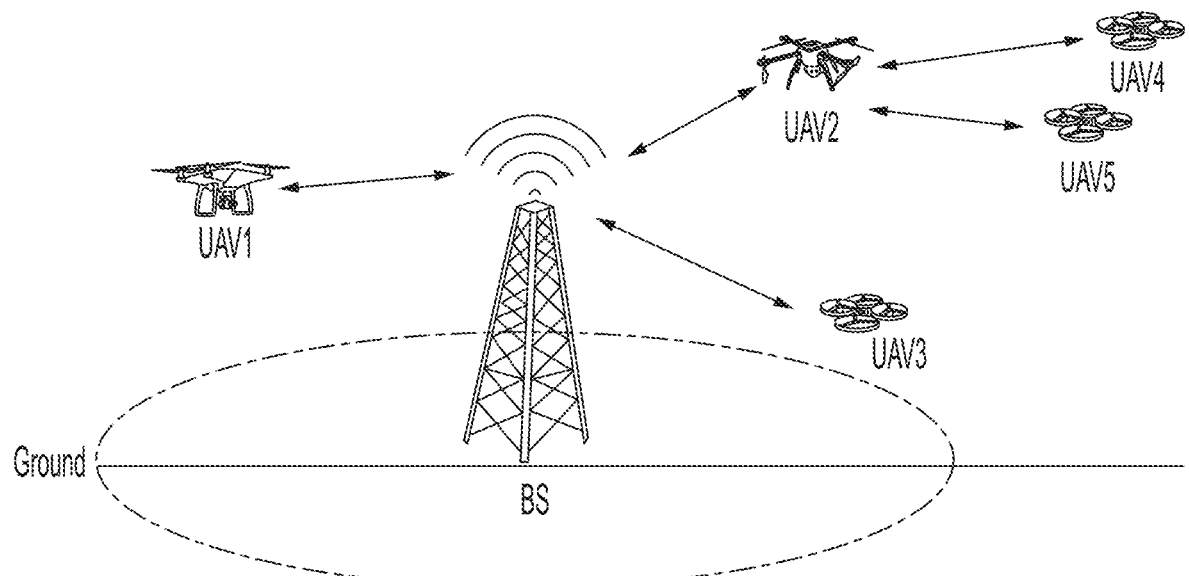
FIG. 14 is a schematic diagram showing another example of the communication scenario according to an embodiment of the present disclosure.

As shown in FIG. 14, the out-of-coverage user equipment UAV4 and UAV5 are both connected to the in-coverage user equipment UAV2. Since the user equipment UAV4 and the user equipment UAV5 cannot receive the configuration information regarding the height threshold from the base station, the user equipment UAV4 and the user equipment UAV5 may each transmits a request (for example, a broadcast request or a multicast request) to a surrounding user equipment to obtain the configuration information regarding the height threshold, so that the in-coverage user equipment UAV2 with which it is connected may determine, configure and/or update, after receiving the request, the height threshold for the user equipments UAV4 and UAV5 according to the configuration information received from the base station or independently.

Referring back to FIG. 13, preferably, the device 300 may further include a configuration unit 310, which may be configured to: determine and/or update a height threshold for a surrounding user equipment based on the configuration information regarding the height threshold from the base station in combination with information related to an out-of-coverage user equipment (including a service life, an operating frequency, a transmission power, a flight height/speed, and the like of the user equipment) known by the device 300, and transmit the determined height threshold to the surrounding user equipment, in response to a request from the surrounding user equipment.

As another preferred example, the request from the surrounding user equipment may further include a resource request of the surrounding user equipment, so that the configuration unit 310 may configure an appropriate height threshold for the surrounding user equipment that transmits the request based on the resource request.

Alternatively, for some user equipments having relatively weak capability, the configuration unit 310 may also merely relay, without any modification, the configuration information regarding the height threshold received from the base station to the surrounding user equipment that transmits the request.

In addition, for some user equipments having strong capability, the configuration unit 310 may independently configure the height threshold based on the information related to the surrounding user equipment and the like know by itself without referring to the configuration information regarding the height threshold from the base station.

It is to be understood that the configuration examples at the in-coverage user equipment side described herein with reference to FIGS. 13 and 14 correspond to the configuration examples at the base station side described above, and for content that is not described in detail herein, reference may be made to the description at the corresponding part above, which is not repeated here.

(1-2-2. Configuration Example of an Out-of-Coverage User Equipment)

Figure 15:
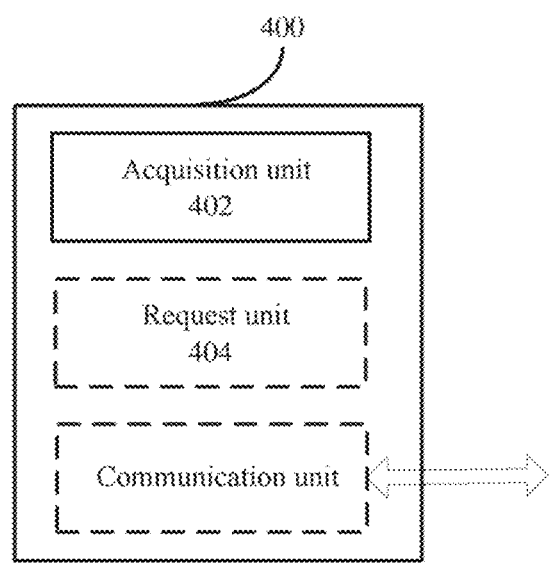
FIG. 15 is a block diagram showing another configuration example of the device at a user equipment side in a wireless communication system according to the first embodiment of the present disclosure.

FIG. 15 is a block diagram showing another configuration example of the device at a user equipment side in a wireless communication system according to the first embodiment of the present disclosure. The user equipment corresponds, for example, to the user equipments UAV4 and UAV5 in the example of a communication scenario shown in FIG. 14.

As shown in FIG. 15, a device 400 according to the embodiment may include an acquisition unit 402, which may be configured to acquire one or more height thresholds for a user equipment in which the device 400 is located based on pre-configuration information or indirectly based on configuration information from a base station.

It is to be noted that, a height threshold for an out-of-coverage user equipment may be at least pre-configurable, for example, may be pre-stored in a memory of the user equipment by the manufacturer when manufacturing the user equipment. In this way, in a case that the user equipment cannot acquire the configuration information regarding the height threshold from the base station, the acquisition unit 402 may read related pre-configuration information from the memory of the user equipment to acquire a height threshold pre-configured for the user equipment.

Preferably, the device 400 may further include a request unit 404, which may be configured to issue a request in a case that there is a connection between the user equipment in which device 400 is located and other in-coverage user equipment, so that the in-coverage user equipment receiving the request may determine and/or update the height threshold for the user equipment based on the configuration information from the base station, or relay the configuration information from the base station. For example, referring to the example of a communication scenario shown in FIG. 14, the out-of-coverage user equipments UAV4 and UAV5 may each issues a request to the in-coverage user equipment UAV2 connected thereto, and receives a height threshold configured by the base station or the user equipment UAV2 from the user equipment UAV2.

Preferably, the request issued by the request unit 404 to the other user equipment may include its own resource request, so that if an in-coverage user equipment receiving the request have strong capability, it may set an appropriate height threshold according to the resource request.

It is to be noted that the various functional units described above with reference to FIGS. 13 and 15 are merely logical modules divided according to the specific functions thereof, and are not intended to limit the specific implementations. In the actual implementation, the functional units and modules may be implemented as separated physical entities, or may be implemented by a single entity (for example, a processor (CPU, DSP or the like), an integrated circuit or the like).

It is to be noted that the device 300 described above with reference to FIG. 13 and the device 400 described above with reference to FIG. 15 may be implemented at a chip level, or may be implemented at a device level by including other peripheral components. For example, the devices 300 and 400 may also operate as the user equipment itself, and may also include a communication unit (which is optional and indicated by a dashed box) for performing communication. For example, the communication unit may be used to perform communication with the base station, communication with the other user equipment, and the like. In addition, it is further to be noted that the specific implementation of the communication unit is not limited here, and it may include one or more communication interface(s) for realizing communication with different external devices.

(1-3. Configuration Example at a Core Network Side)

Figure 16:
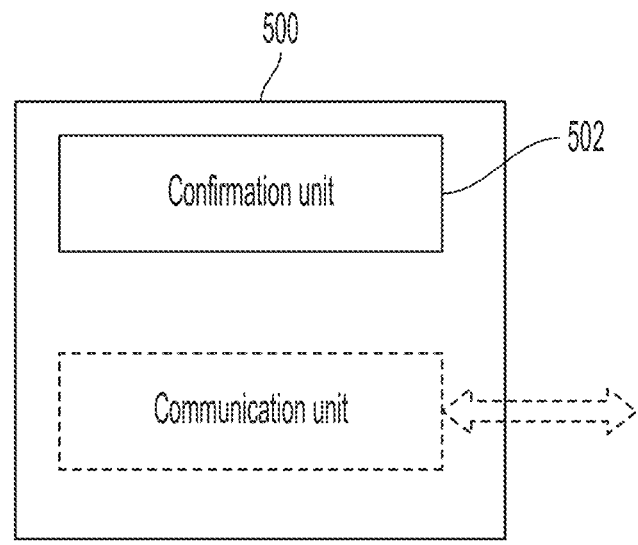
FIG. 16 is a block diagram showing a configuration example of a device at a core network side in a wireless communication system according to the first embodiment of the present disclosure.

FIG. 16 is a block diagram showing a configuration example of a device at a core network side in a wireless communication system according to the first embodiment of the present disclosure.

As shown in FIG. 16, a device 500 according to the embodiment may include a confirmation unit 502, which may be configured to confirm whether the user equipment is allowed to use the current network in response to a request from a base station (for example, an attach request received from a user equipment in the above attach procedure). The user equipment is determined by the base station to have the UAV communication capability. Specifically, the confirmation unit 502 may confirm whether the user equipment is allowed to access the current network legally according to the identity information (for example, IMEI) of the user equipment included in the received request.

Then, a confirmation result of the confirmation unit 502 (for example, the "attach accept" message in the above attach procedure) may be transmitted to the base station, so that the device at the base station side may determine, configure, and update the one or more height thresholds for the user equipment according to the confirmation result.

In addition, the confirmation result is also transmitted to the user equipment by the base station, so that the user equipment may perform an attachment (or access) to the current network according to the received confirmation result.

For a detailed description of the authentication process for the user equipment, reference may be made to the description at the corresponding part in the above embodiment of the base station side, which is not repeated here.

Similarly, it is to be noted that the various functional units described above with reference to FIG. 16 are merely logical modules divided according to the specific functions thereof, and are not intended to limit the specific implementations. In the actual implementation, the functional units and modules may be implemented as separated physical entities, or may be implemented by a single entity (for example, a processor (CPU, DSP or the like), an integrated circuit or the like).

It is to be noted that the device 500 described with reference to FIG. 16 may be implemented at a chip level, or may be implemented at a device level by including other peripheral components. For example, the device 500 may also include a communication unit (which is optional and indicated by a dashed box) for performing communication. For example, the communication unit may be used to perform communication with the base station and the like. In addition, it is further to be noted that the specific implementation of the communication unit is not limited here, and it may include one or more communication interface(s) for realizing communication with different external devices.

In addition, it is to be noted that although the device embodiments (including the device at a base station side, the device at a user equipment side, and the device at a core network side) of the present disclosure are described above with reference to the block diagrams shown in the drawings, they are exemplary rather than restrictive. Those skilled in the art may modify the shown functional configuration examples according to the principles of the present disclosure. For example, various functional modules in the embodiment may be added, deleted, modified, combined or the like, and all of such modifications are considered to fall within the scope of the present disclosure.

(1-4. Method Embodiment)

Corresponding to the above device embodiment, a method embodiment is further provided according to the present disclosure. The method embodiment according to the present disclosure is described simply in conjunction with FIGS. 17 to 20.

Figure 17:
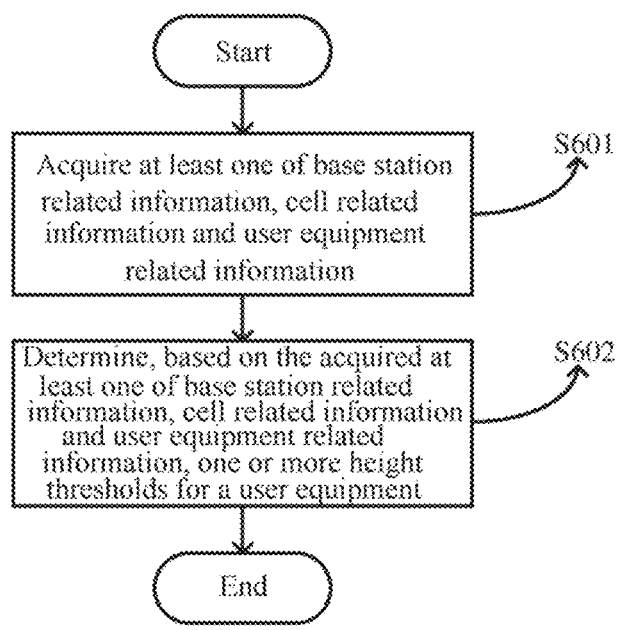
FIG. 17 is a flowchart showing a process example of a method at a base station side in a wireless communication system according to the first embodiment of the present disclosure.

FIG. 17 is a flowchart showing a process example of a method at a base station side in a wireless communication system according to the first embodiment of the present disclosure.

As shown in FIG. 17, the method according to the embodiment starts at step S601. In step S601, one or more of base station related information, cell related information, and user equipment related information are acquired.

Then, the method proceeds to step S602. In step S602, one or more height thresholds for a user equipment are determined based on the acquired one or more of base station related information, cell related information, and user equipment related information.

It is to be noted that the method embodiment described herein corresponds to the device embodiment at the base station side described above, and for the content which is not described in detail herein, reference may be made to the description at the corresponding part above, which is not repeated here.

Figure 18:
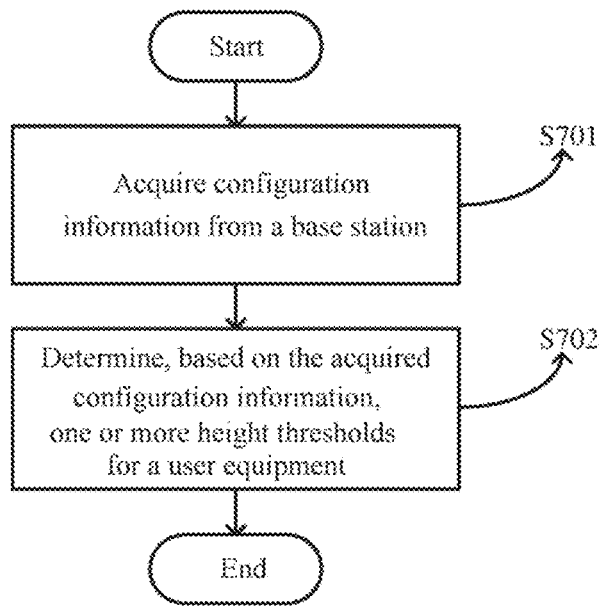
FIG. 18 is a flowchart showing a process example of a method at a user equipment side in a wireless communication system according to the first embodiment of the present disclosure.

FIG. 18 is a flowchart showing a process example of a method at a user equipment side in a wireless communication system according to the first embodiment of the present disclosure.

As shown in FIG. 18, the method according to the embodiment starts at step S701. In step S701, configuration information from a base station is acquired. The configuration information may be included in physical layer signaling, MAC layer signaling, or RRC layer signaling.

Then, the method proceeds to step S702. In step S702, one or more height thresholds for the user equipment are determined based on the acquired configuration information.

It is to be noted that the method embodiment described herein corresponds to the device embodiment at the in-coverage user equipment side described above, and for the content which is not described in detail herein, reference may be made to the description at the corresponding part above, which is not repeated here.

Figure 19:
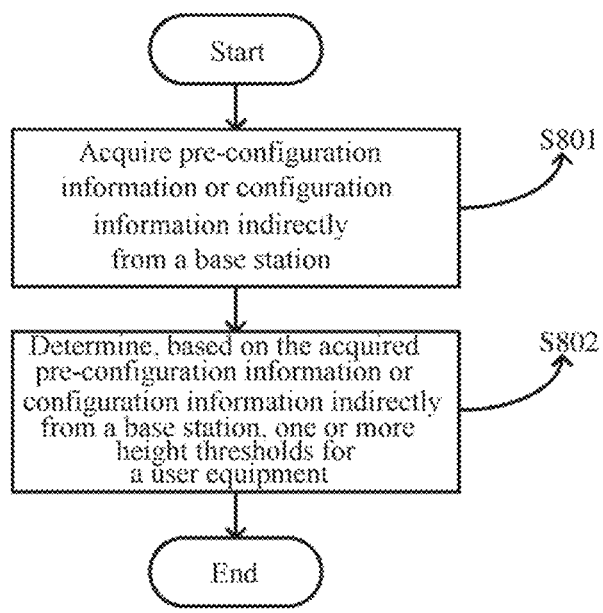
FIG. 19 is a flowchart showing another process example of the method at a user equipment side in a wireless communication system according to the first embodiment of the present disclosure.

FIG. 19 is a flowchart showing another process example of the method at a user equipment side in a wireless communication system according to the first embodiment of the present disclosure.

As shown in FIG. 19, the method according to the embodiment starts at step S801. In step S801, configuration information indirectly from the base station or pre-configuration information is acquired.

Then, the method proceeds to step S802. In step S802, one or more height thresholds for the user equipment are determined based on the pre-configuration information or the configuration information indirectly from the base station.

It is to be noted that the method embodiment described herein corresponds to the device embodiment at the out-of-coverage user equipment side described above, and for the content which is not described in detail herein, reference may be made to the description at the corresponding part above, which is not repeated here.

Figure 20:
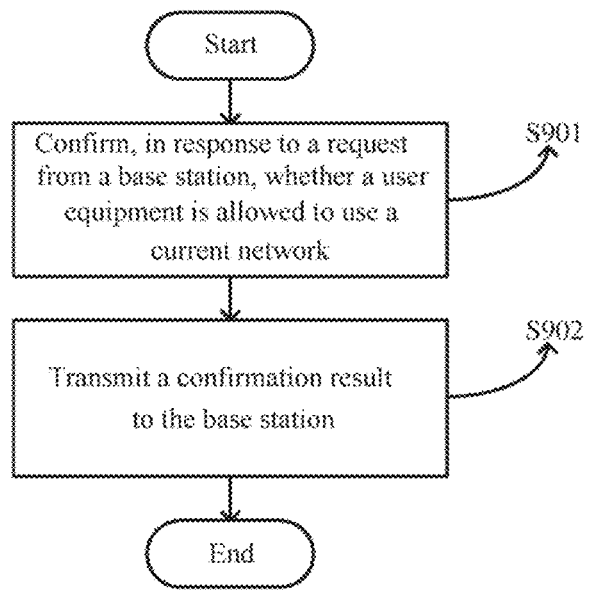
FIG. 20 is a flowchart showing a process example of a method at a core network side in a wireless communication system according to the first embodiment of the present disclosure.

FIG. 20 is a flowchart showing a process example of a method at a core network side in a wireless communication system according to the first embodiment of the present disclosure.

As shown in FIG. 20, the method according to the embodiment starts at step S901. In step S901, in response to a request from a base station, it is confirmed whether the user equipment is allowed to use a current network, wherein the user equipment is determined by the base station to have UAV communication capability.

Then, the method proceeds to step S902. In step S902, a confirmation result is transmitted to the base station, for the base station to forward it to the user equipment to perform the attaching operation to the current network, and/or for the base station to determine a height threshold for the user equipment.

It is to be understood that the method embodiment described here corresponds to the above described device embodiment at a core network side, and for content which is not described in detail here, reference may be made to the above descriptions at the corresponding part, which is not repeated herein.

In addition, it is to be understood that flow charts shown in above FIGS. 17 to 20 are exemplary rather than restrictive. Those skilled in the art may modify the illustrated processing flow examples according to the principles of the present disclosure. For example, various steps in the embodiment may be added, deleted, modified, combined or the like, and all of such modifications are considered to fall within the scope of the present disclosure.

According to the first embodiment of the present disclosure described above, it is possible to reasonably determine, configure, and update one or more height thresholds for the user equipment, where the height threshold is an important factor for implementing and optimizing various application scenarios (for example, configuration of operation modes, resource allocation) for the LTE-based UAV communication. In addition, identification and authentication operations on the user equipment in the UAV communication are also described.

In the following description, an example of an application scenario of the height threshold in the UAV communication is given.

Here, it is to be noted that in application example based on a height threshold described below, the height threshold may be determined according to the above-described technology of the present disclosure, may be pre-configured, or may be determined according to other technology than the above-described technology of the present disclosure, which is not specifically limited in the present disclosure, and only the solution on how to solve related problems in the UAV communication by using the height threshold is focused.

In addition, it is also to be noted that the application examples described below are all directed to a user equipment having the UAV communication capability and allowed to use a current network legally (that is, a user equipment that is identified by the identification process and authenticated by the authentication process).

2. Second Embodiment (Operation Mode Configuration Based on a Height Threshold)

In a case that a UAV is not taken off or has a relatively low flight height (relative to a height of a base station), the UAV is similar to an ordinary user equipment on the ground, so that the UAV may operate in an operation mode similar to that of the ordinary user equipment. Here, the operation mode in which the UAV flies at a height lower than a certain height threshold is referred to as a "hovering mode". However, in a case that the flight height of the UAV is high, the hovering mode cannot meet the communication requirement of the UAV. In this case, the UAV may preferably operate in another operation mode different from the above hovering mode. Here, the operation mode in which the UAV flies at a height above a certain height threshold is referred to as a "flying mode".

Therefore, it may be considered to determine the operation mode of the UAV based on the height threshold, which facilitates assisting the resource allocation, eliminating the interference, assisting the handover and the like.

(2-1. Configuration Example at a Base Station Side)

Figure 21:
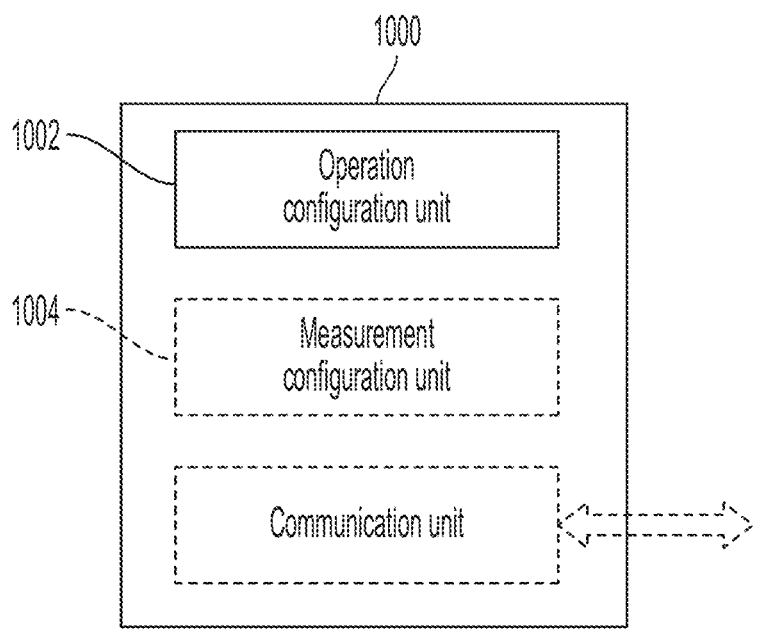
FIG. 21 is a block diagram showing a configuration example of a device at a base station side in a wireless communication system according to a second embodiment of the present disclosure.

FIG. 21 is a block diagram showing a configuration example of a device at a base station side in a wireless communication system according to the second embodiment of the present disclosure.

As shown in FIG. 21, a device 1000 according to the embodiment may include an operation configuration unit 1002, which may be configured to configure an operation of a user equipment directly or indirectly based on one or more height thresholds for the user equipment and a current height of the user equipment.

As an example, the base station may instruct the user equipment to turn on or turn off the flying mode or perform (apply) an operation in a corresponding mode based on height threshold information and height information reported by the user equipment.

Preferably, the device 1000 may further include a measurement configuration unit 1004, which may be configured to generate measurement configuration information for the user equipment, so that the user equipment reports information related to its current height based on the measurement configuration information. The specific measurement report process is similar to the measurement report process described in the above first embodiment, which is not repeated here.

Then, the operation configuration unit 1002 may determine, according to the height information reported by the user equipment based on the measurement configuration information of the measurement configuration unit 1004, whether the current height of the user equipment is higher than a smallest height threshold of the one or more height thresholds, and instruct the user equipment to turn on or turn off the flying mode according to a determination result. Specifically, for example, if it is determined that the current height is higher than the smallest height threshold, the user equipment is instructed to turn on the flying mode, otherwise, the user equipment is instructed to turn off the flying mode.

Alternatively, the user equipment may also actively turn on or turn off the flying mode based on a relationship between the current height and the height threshold. For example, in a case that it is determined that the current height is higher than the smallest height threshold, the user equipment actively turn on the flying mode; otherwise, the user equipment actively turn off the flying mode; and the user equipment further reports the height information at this time to the base station. In this way, the operation configuration unit 1002 in the device at the base station side may determine that the user equipment has turned on the flying mode if it determines that the current height is higher than the smallest height threshold according to the received height information, so that the base station may apply a related operation in the flying mode on the user equipment (for example, schemes of resource allocation, interference coordination, handover, and the like in the flying mode). On the other hand, if the base station determines that the current height is lower than or equal to the smallest height threshold, the base station determines that the user equipment has turned off the flying mode, so that the base station may apply a related operation in the hovering mode on the user equipment.

Figure 22:
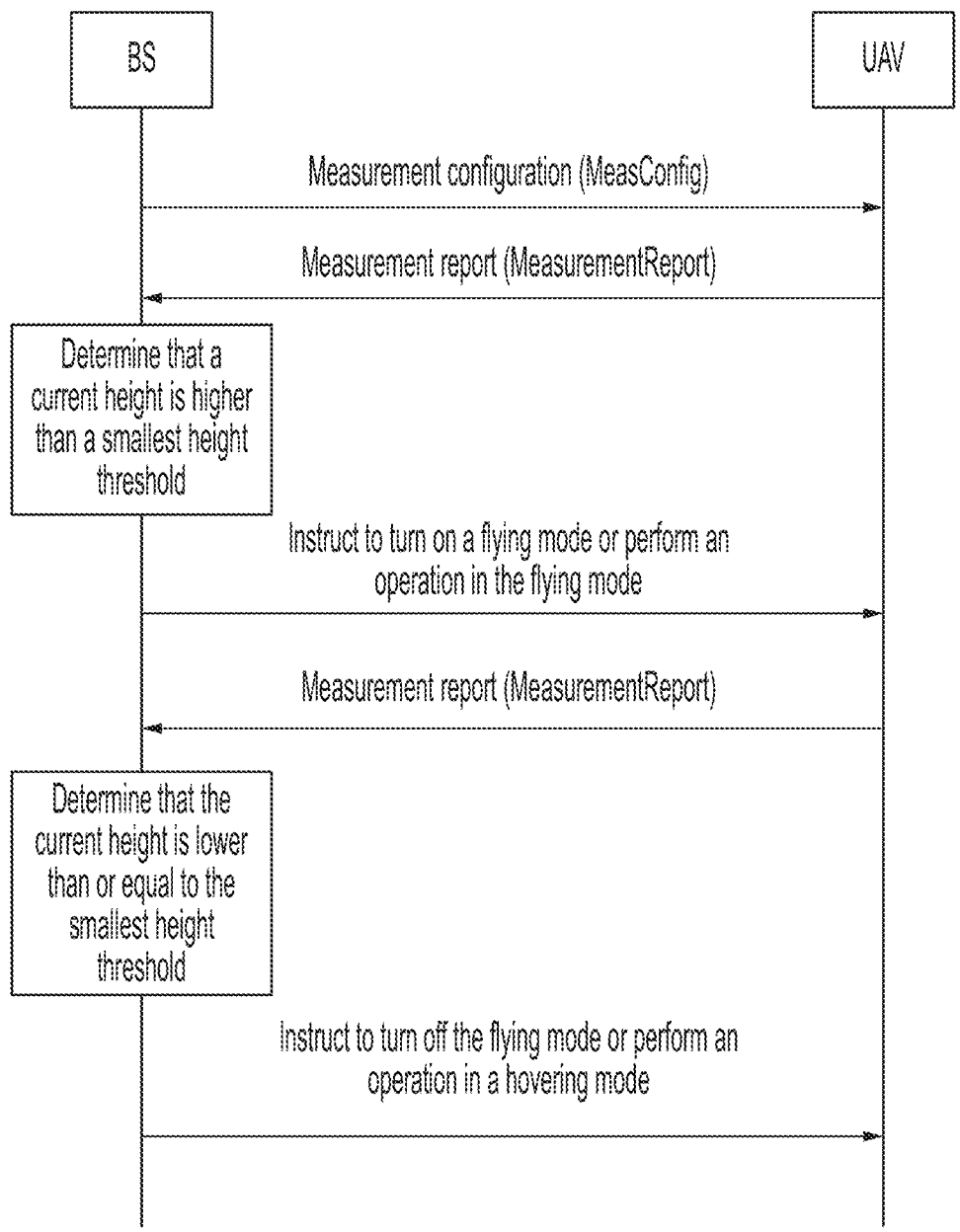
FIG. 22 is a flowchart showing an example of a signaling interaction process for implementing a height threshold based operation mode configuration according to an embodiment of the present disclosure.

FIG. 22 is a flowchart showing an example of a signaling interaction process in this example case.

As shown in FIG. 22, the base station transmits the measurement configuration information to the user equipment UAV by using, for example, a MeasConfig message, so that the user equipment UAV reports its height information periodically, non-periodically, or based on the event triggering according to the received measurement configuration information (for example, the reporting is performed in a case that the current height is determined to be higher than the smallest height threshold, to reduce the signaling overhead). Then, the base station instructs the user equipment to turn on or turn off the flying mode based on the received height information, or apply a related operation in the flying mode or a related operation in the hovering mode on the user equipment (corresponding to the case where the user equipment actively turns on/turns off the flying mode).

Alternatively, as another example, the user equipment may also not directly report the information related to the current height to the base station, but determines by itself whether to turn on or turn off the flying mode according to information regarding the current height and the height threshold, and issue a request to the base station according to a determination result, so that the base station configures an operation for the user equipment according to the received request.

Specifically, the operation configuration unit 1002 may instruct the user equipment to turn on the flying mode or apply the related operation in the flying mode on the user equipment (corresponding to the case that the user equipment actively turns on the flying mode) in response to the request transmitted by the user equipment in a case that its current height is higher than the smallest height threshold. On the other hand, the operation configuration unit 1002 may instruct the user equipment to turn off the flying mode or apply the related operation in the hovering mode on the user equipment (corresponding to the case that the user equipment actively turns off the flying mode) in response to the request transmitted by the user equipment in a case that its current height is lower than or equal to the smallest height threshold.

Figure 23:
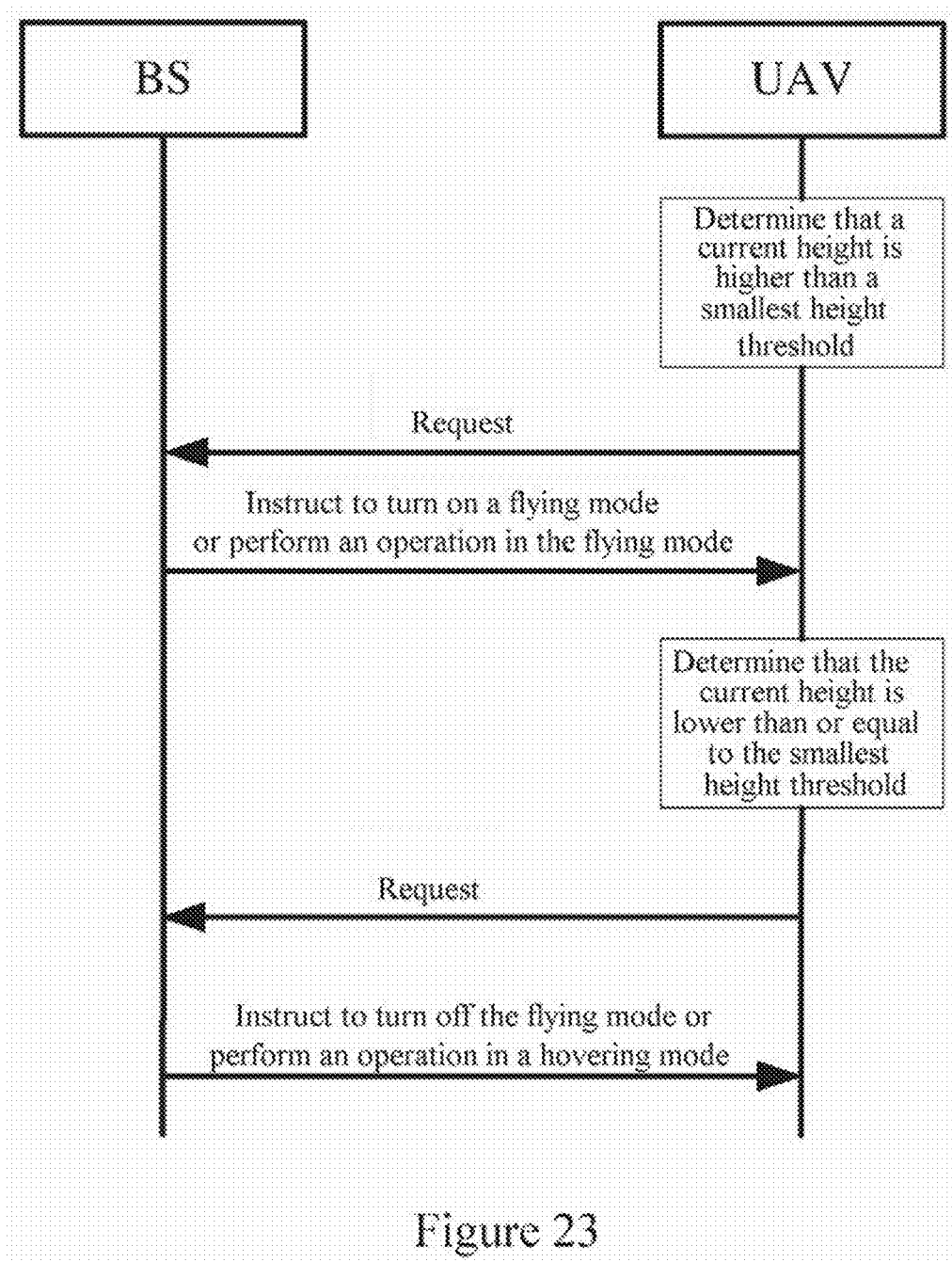
FIG. 23 is a flowchart showing another example of a signaling interaction process for implementing a height threshold based operation mode configuration according to an embodiment of the present disclosure.

FIG. 23 is a flow chart showing a signaling interaction process in this example case.

As shown in FIG. 23, the user equipment UAV may obtain its current height by, for example, GPS positioning, and issue (make) a request to the base station BS in a case that it is determined that the current height is higher than the smallest height threshold. After receiving the request, the base station BS instructs the user equipment to turn on the flying mode or apply the related operation in the flying mode on the user equipment. In a case that it is determined that the current height is lower than or equal to the smallest height threshold, the user equipment UAV issue a request to the base station BS again, so that the base station BS may instruct, according to the received request, the user equipment to turn off the flying mode or apply the related operation in the hovering mode on the user equipment.

It is to be understood that the examples of the signaling interaction processes shown in FIGS. 22 and 23 are given only to explain the principles of the present disclosure and do not constitute any limitation, where the illustration and description not related to the technology of the present disclosure are omitted to avoid blurring, and those skilled in the art may make appropriate modifications to the signaling interaction processes according to the principles of the present disclosure.

It is to be noted that although in the above example, the smallest height threshold is used as a criterion for switching between the flying mode and the hovering mode, it is to be understood that the criterion may also be set to be smaller or greater than the smallest height threshold according to actual conditions.

It is to be noted that the device 1000 described above with reference to FIG. 21 may be implemented at a chip level, or may be implemented at a device level by including other peripheral components. For example, the device 1000 may also operate as the base station itself, and may also include a communication unit (which is optional and indicated by a dashed box) for performing communication. For example, the communication unit may be used to perform communication with the user equipment, communication with the other base station, communication with the core network equipment, and the like. In addition, it is to be further noted that the specific implementation of the communication unit is not limited here, and it may include one or more communication interface(s) for realizing communication with different external devices.

(2-2. Configuration Example at a User Equipment Side)

Figure 24:
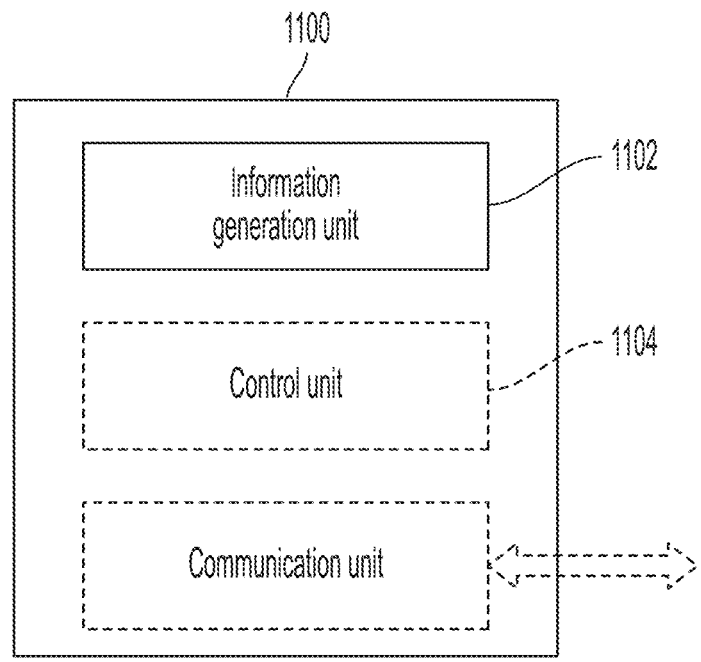
FIG. 24 is a block diagram showing a configuration example at a user equipment side in a wireless communication system according to the second embodiment of the present disclosure.

Corresponding to the configuration example at a base station side described above, a configuration example at a user equipment side is described below. FIG. 24 is a block diagram showing a configuration example at a user equipment side in a wireless communication system according to the second embodiment of the present disclosure.

As shown in FIG. 24, a device 1100 according to the embodiment may include an information generation unit 1102, which may be configured to generate information directly or indirectly related to a current height of the user equipment. The information may be transmitted to the base station for the base station to configure an operation for the user equipment based on the information and one or more height thresholds for the user equipment.

Specifically, as an example, the information generating unit 1102 may be configured to generate a measurement report including its current height periodically, non-periodically, or based on event triggering according to measurement configuration information from the base station, as information directly related to the current height of the user equipment.

In this way, the base station may instruct, based on the received height information and the one or more height thresholds for the user equipment, the user equipment to turn on or turn off the flying mode, or apply a related operation in the flying mode or the hovering mode on the user equipment (corresponding to the case that the user equipment actively turns on or turns off the flying mode).

Alternatively, as another example, the information generation unit 1102 may be configured to generate a request related to the flying mode and the hovering mode based on the current height of the user equipment and the one or more height thresholds for the user equipment, as information indirectly related to the current height of the user equipment. The request may indicate that the user equipment needs to turn on or turn off the flying mode at this time, or may also indicate that the user equipment has turned on or turned off the flying mode to request the base station to perform the operation in a corresponding mode thereon.

Specifically, the information generation unit 1102 may generate a request for turning on the flying mode or performing the operation in the flying mode in a case that the current height is higher than a smallest height threshold, and generate a request for turning off the flying mode or performing the operation in the hovering mode in a case that the current height is lower than or equal to the smallest height threshold.

Preferably, the device 1100 may further include a control unit 1104, which may be configured to turn on or turn off the flying mode of the user equipment in response to an indication from the base station, the indication from the base station may be determined according to the received height information or according to a request from the user equipment.

Alternatively, the control unit 1104 may be further configured to actively turn on or turn off the flying mode of the user equipment according to a relationship between the current height and the smallest height threshold.

It is to be understood that there is no need to distinguish whether the user equipment is within the coverage of the base station. Specifically, an in-coverage user equipment may use configuration information regarding the height threshold received from the base station, and an out-of-coverage user equipment may use a pre-configured height threshold or a height threshold configured or forwarded by other user equipment. In other words, in this application example, neither the method of determining the height threshold nor the method of acquiring the height threshold is limited.

It is to be noted that the configuration example at the user equipment side described herein corresponds to the configuration examples at the base station side described above with reference to FIGS. 21 to 23, and for the content not described in detail herein, reference may be made to the description at the corresponding part above, which is not repeated here.

It is to be noted that the device 1100 described above with reference to FIG. 24 may be implemented at a chip level, or may be implemented at a device level by including other peripheral components. For example, the device 1100 may also operate as the user equipment itself, and may also include a communication unit (which is optional and indicated by a dashed box) for performing communication. For example, the communication unit may be used to perform communication with the other user equipment, communication with the base station, and the like. In addition, it is to be further noted that the specific implementation of the communication unit is not limited here, and it may include one or more communication interface(s) for realizing communication with different external devices.

It is to be noted that the various functional units described above with reference to FIGS. 21 and 24 are merely logical modules divided according to the specific functions thereof, and are not intended to limit the specific implementations. In the actual implementation, the functional units and modules may be implemented as separated physical entities, or may be implemented by a single entity (for example, a processor (CPU, DSP or the like), an integrated circuit or the like).

In addition, it is to be noted that although the device embodiments (including the device at a base station side and the device at a user equipment side) of the present disclosure are described above with reference to the block diagrams shown in the drawings, they are exemplary rather than restrictive. Those skilled in the art may modify the shown functional configuration examples according to the principles of the present disclosure. For example, various functional modules in the embodiment may be added, deleted, modified, combined or the like, and all of such modifications are considered to fall within the scope of the present disclosure.

(2-3. Method Embodiment)

Corresponding to the above device embodiments, method embodiments according to the present disclosure are described below.

Figure 25:
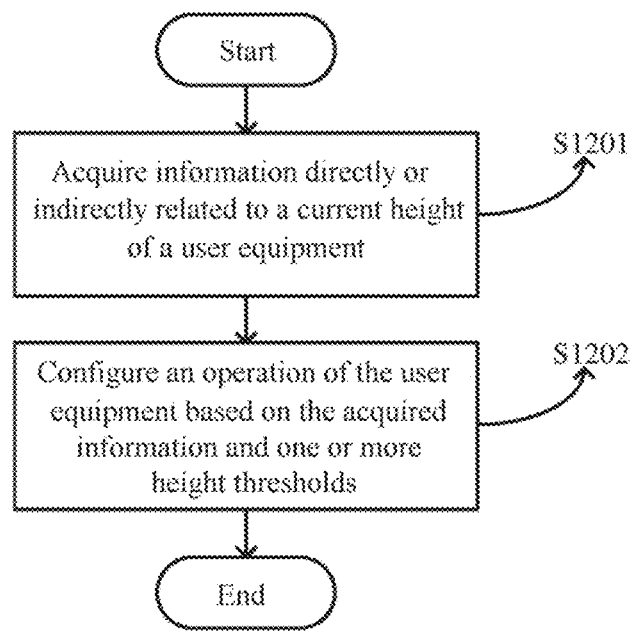
FIG. 25 is a flowchart showing a process example of a method at a base station side in a wireless communication system according to the second embodiment of the present disclosure.

FIG. 25 is a flowchart showing a process example of a method at a base station side in a wireless communication system according to the second embodiment of the present disclosure.

As shown in FIG. 25, the method according to the embodiment starts at step S1201. In step S1201, information directly or indirectly related to a current height of a user equipment is acquired, and the information may be height information reported by the user equipment according to measurement configuration information or may be a request issued by the user equipment according to its current height and the height threshold.

Then, the method proceeds to step S1202. In step S1202, an operation of the user equipment is configured according to the received information and the height threshold for the user equipment. For example, the user equipment is instructed to turn on or turn off the flying mode, or an operation in the flying mode or the hovering mode is performed on the user equipment.

It is to be noted that the method embodiment described herein corresponds to the device embodiment described above with reference to FIG. 21, and for the content which is not described in detail here, reference may be made to the above description at the corresponding part, which is not repeated here.

Figure 26:
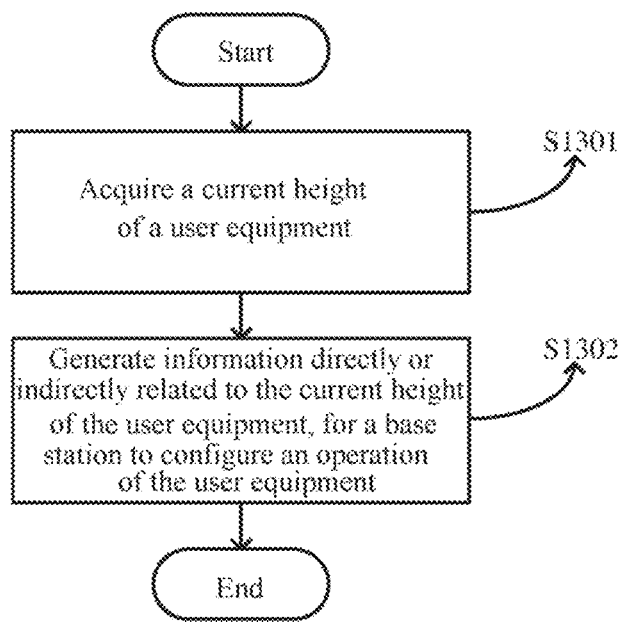
FIG. 26 is a flowchart showing a process example of a method at a user equipment side in a wireless communication system according to the second embodiment of the present disclosure.

FIG. 26 is a flowchart showing a process example of a method at a user equipment side in a wireless communication system according to the second embodiment of the present disclosure.

As shown in FIG. 26, the method according to the embodiment starts at step S1301. In step S1301, the current height of the user equipment is acquired.

Then, the method proceeds to step S1302. In step S1302, information directly or indirectly related to the current height is generated, which may be the current height itself or may also be a request transmitted by the user equipment according to the current height. The information is transmitted to the base station for the base station to configure the operation of the user equipment according to the information and the height threshold.

It is to be noted that the method embodiment described herein corresponds to the device embodiment at the user equipment side described above with reference to FIG. 24, and for the content that is not described in detail herein, reference may be made to the description at the corresponding part above, which is not repeated here.

In addition, it is to be understood that the flowcharts shown in FIG. 25 and FIG. 26 described above are merely exemplary rather than restrictive, and those skilled in the art may modify the illustrated processing flow examples according to the principles of the present disclosure. For example, various steps in the embodiment are added, deleted, modified, combined, and the like, and all of such modifications are considered to fall within the scope of the present disclosure.

According to the above second embodiment of the present disclosure, the operation mode of the user equipment is configured or the operation in a corresponding operation mode is performed based on the height information and the height threshold for the user equipment, which facilitates optimizing related operations in the UAV communication scenario (for example, resource allocation, interference coordination and the like).

3. Third Embodiment (Resource Allocation Based on a Height Threshold)

As described above, for a UAV before being taken-off or having a low flight height, the UAV is similar to an ordinary user equipment on the ground, so that the UAV may be regarded as an ordinary user equipment, and resource allocation is performed with an existing resource allocation scheme. However, in a case that the flight height of the UAV is high, the existing resource allocation scheme may not meet the requirement of the communication scenario. For example, there are problems such as low resource utilization and large interference. Therefore, there is a need to provide a resource allocation scheme for the UAV communication scenario.

Figure 27:
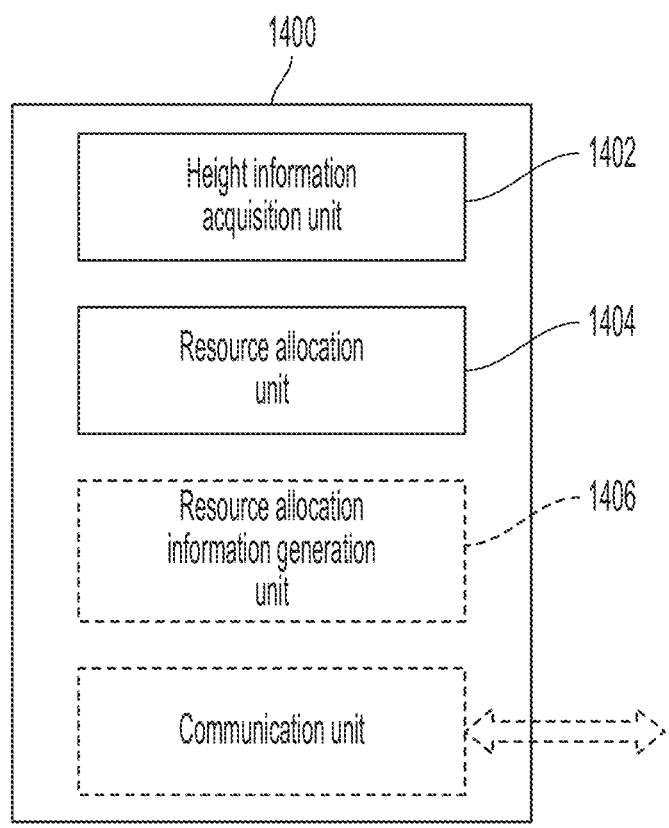
FIG. 27 is a block diagram showing a configuration example of a device at a base station side in a wireless communication system according to a third embodiment of the present disclosure.

FIG. 27 is a block diagram showing a configuration example of a device at a base station side in a wireless communication system according to the third embodiment of the present disclosure.

As shown in FIG. 27, a device 1400 according to the embodiment may include a height information acquisition unit 1402 and a resource allocation unit 1404.

Specifically, the height information acquisition unit 1402 may be configured to acquire at least height information of one or more user equipments. Preferably, the height information of the user equipment may be acquired from a newly added MAC CE, uplink control information (UCI), channel status information (CSI), or a measurement report from the user equipment (a measurement result reported based on a measurement configuration of a base station).

For the manner of generating the measurement report including a current height of the user equipment based on the measurement configuration of the base station, reference may be made to the above related descriptions in the first embodiment and the second embodiment, which is not repeated here.

For carrying height information by using UCI, one or more bits may be added to the existing UCI format. In this way, in a case that the user equipment issues an uplink scheduling request to the base station, the height information of the user equipment may be transmitted to the base station together, for the base station to perform more accurate resource scheduling. Preferably, as an example, in order to reduce the transmission load on the PUCCH, the user equipment may first quantize its current height, and look up a table according to a quantization result to obtain corresponding bit information indicating the current height. In this way, the height information acquisition unit 1402 at the base station side may look up the table according to the received bit information, to determine the current height of the user equipment.

On the other hand, a high flight height indicates a large path loss and thus a bad channel quality. That is, in fact, there is a certain correlation between the flight height and the channel status information CSI. Therefore, the height information acquisition unit 1402 at the base station side may also determine the current height of the user equipment by, for example, looking up the table according to the received CSI.

In addition, preferably, in order to reduce the communication load and the processing load, the user equipment may also be configured to report the height information only in a case that its current height is determined to be greater than a certain threshold (for example, a smallest height threshold), and thus the current resource allocation manner cannot meet its communication requirement.

It is to be understood that the height information acquiring manner given above is only a preferred example rather than a limitation, and those skilled in the art may also acquire height information of the user equipment with other methods in the field, such as the base station directly locating the user equipment by a triangulation technology or the like, which is not specifically limited here.

The resource allocation unit 1404 may be configured to perform resource allocation for each user equipment based on height information and a height threshold for the user equipment.

Preferably, the device 1400 may further include a resource allocation information generation unit 1406, which may be configured to generate information including an allocated time-frequency resource to be transmitted to the user equipment. Preferably, the resource allocation information may be included in uplink grant signaling (UL grant) or downlink control information (DCI), to be transmitted to the user equipment.

The resource allocation unit 1404 may be configured to switch, for each user equipment, between a traditional resource allocation manner and a height-based resource allocation manner based on a relationship between a current height of the user equipment and a smallest height threshold for the user equipment. Specifically, if the current height is higher than the smallest height threshold, the resource allocation is performed in the height-based resource allocation manner; if the current height is lower than or equal to the smallest height threshold, the UAV may be regarded as an ordinary user equipment, and the resource allocation is performed in the traditional resource allocation manner.

Figure 28:
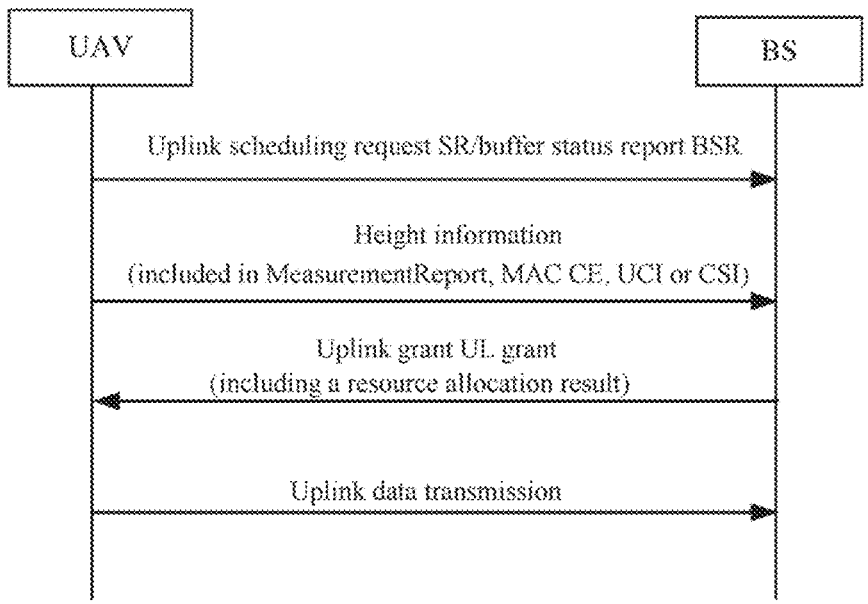
FIG. 28 is a flowchart showing an example of a signaling interaction process of a resource allocation scheme according to an embodiment of the present disclosure.

FIG. 28 is a flowchart showing an example of a signaling interaction process of a resource allocation scheme according to an embodiment of the present disclosure.

As shown in FIG. 28, in a case that the user equipment UAV needs to perform resource scheduling, the user equipment UAV transmits an uplink scheduling request (SR) or a buffer status report (BSR) to the base station BS, and reports its height information. After receiving such information, the base station BS allocates a time-frequency resource for the user equipment based on the height information and the height threshold for the user equipment, and notifies the user equipment UAV of the allocated resource by using the UL grant signaling. Then, the user equipment UAV may perform data transmission on the time-frequency resource allocated by the base station.

As an example, in the case of performing resource allocation in the height-based resource allocation manner, the resource allocation unit 1404 may be configured to determine a height interval in which the user equipment is located according to a relationship between the current height and the one or more height thresholds, and perform resource allocation to the user equipment according to the height interval in which the user equipment is located.

However, it is a rough resource allocation manner that the resource allocation is performed based only on the height interval in which the user equipment is located. Since the base station may generally acquire more information related to the user equipment within its coverage, more accurate resource allocation may be performed.

Preferably, the resource allocation unit 1404 may be configured to allocate the same or different time-frequency resources to the user equipments in the same height interval, according to assistance (auxiliary) information.

As an example, for two user equipments in the same height interval, resource allocation may be performed according to information related to a horizontal distance between the two user equipments. Detailed description is made in conjunction with FIG. 29, which is a schematic diagram showing an example of a resource allocation scheme according to an embodiment of the present disclosure.

Figure 29:
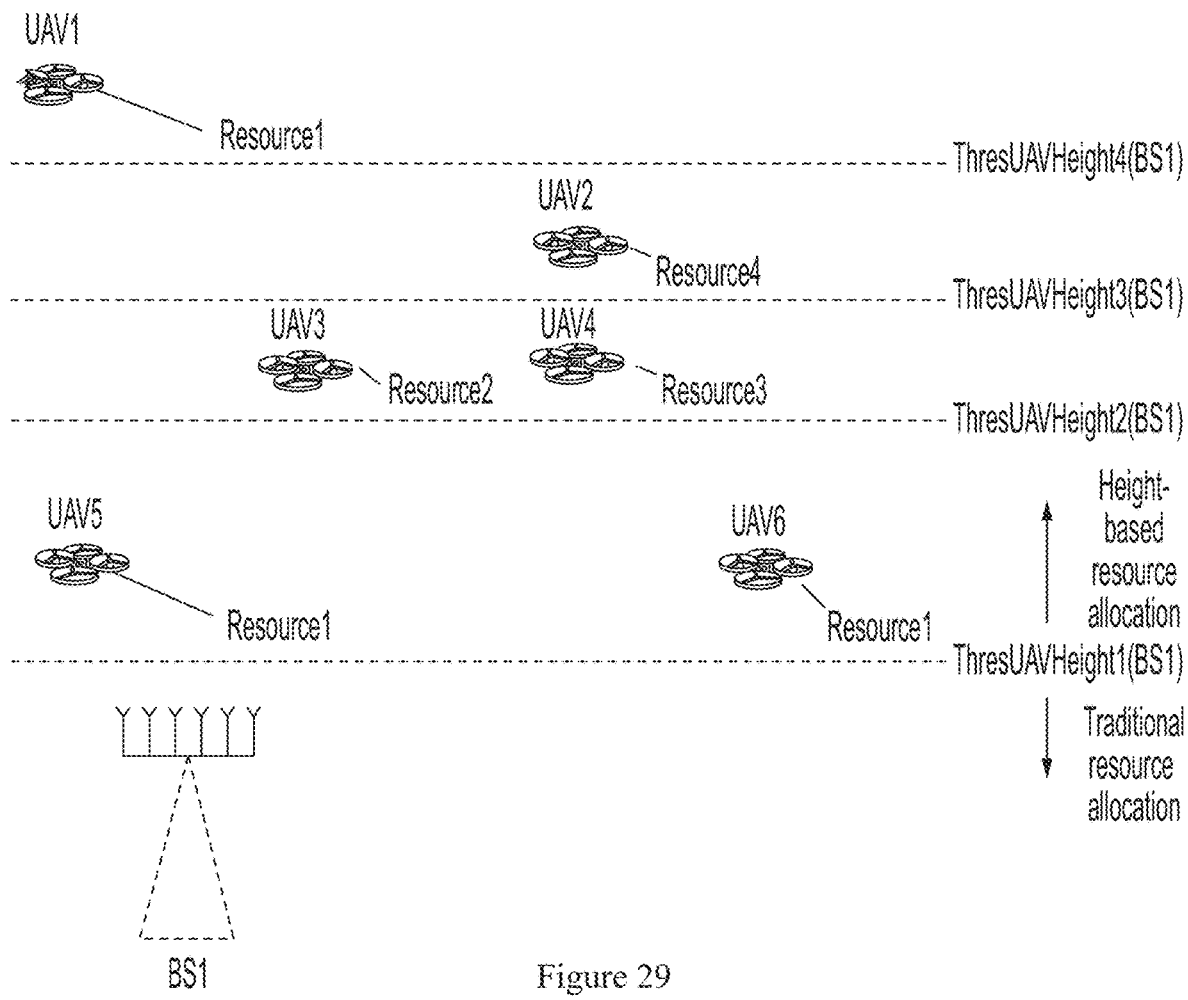
FIG. 29 is a schematic diagram showing an example of a resource allocation scheme based on a height interval according to an embodiment of the present disclosure.

As shown in FIG. 29, the user equipments UAV5 and UAV6 are located in the same height interval, and the user equipments UAV3 and UAV4 are located in the same height interval. The UAV5 and the UAV6, with a great horizontal distance and thus a small interference, are allocated with the same resource 1 to improve resource utilization. The UAV3 and UAV4, with a small horizontal distance and thus a strong interference, are allocated with different resources 2 and 3 to avoid interference.

It is to be understood that the manner of performing accurate resource allocation further based on the horizontal distance as the assistance information is only an example. For example, resource allocation may also be performed according to other interference related information or the like, which is not described in detail herein.

Moreover, preferably, the resource allocation unit 1404 may be configured to allocate, for different user equipments in different height intervals, the same or different time-frequency resources according to a distance between height intervals in which these user equipments are respectively located.

As shown in FIG. 29, for example, if it is determined that the distance between the height intervals of the two user equipments is large (for example, greater than a predetermined threshold), in order to improve resource utilization, it may be considered to allocate the same time-frequency resource to the two user equipments (for example, as shown in FIG. 29, the user equipments UAV1 and UAV5 are all allocated with a resource 1). On the other hand, if the distance between the height intervals of the two user equipments is not too large (for example, less than a predetermined threshold), it is required to perform more accurate resource allocation according to further information.

It may be understood that, in actual resource allocation, in addition to considering the essential height information, the base station may perform comprehensive consideration according to information of multiple aspects that it knows to optimize the resource allocation.

As another preferred example, the resource allocation unit 1404 may be further configured to acquire three-dimensional position information of the user equipment and perform resource allocation according to the three-dimensional position information of the user equipment.

In particular, the resource allocation unit 1404 may be configured to perform resource allocation according to a distance between three-dimensional positions of the user equipments. For example, if a distance between the three-dimensional positions of the two user equipments is large (higher than a predetermined threshold), it may be considered to allocate the same resource to the two user equipments to improve resource utilization. If the distance between the three-dimensional positions of the two user equipments is small (less than a predetermined threshold), it is required to allocate different time-frequency resources to the two user equipments to reduce interference.

Figure 30:
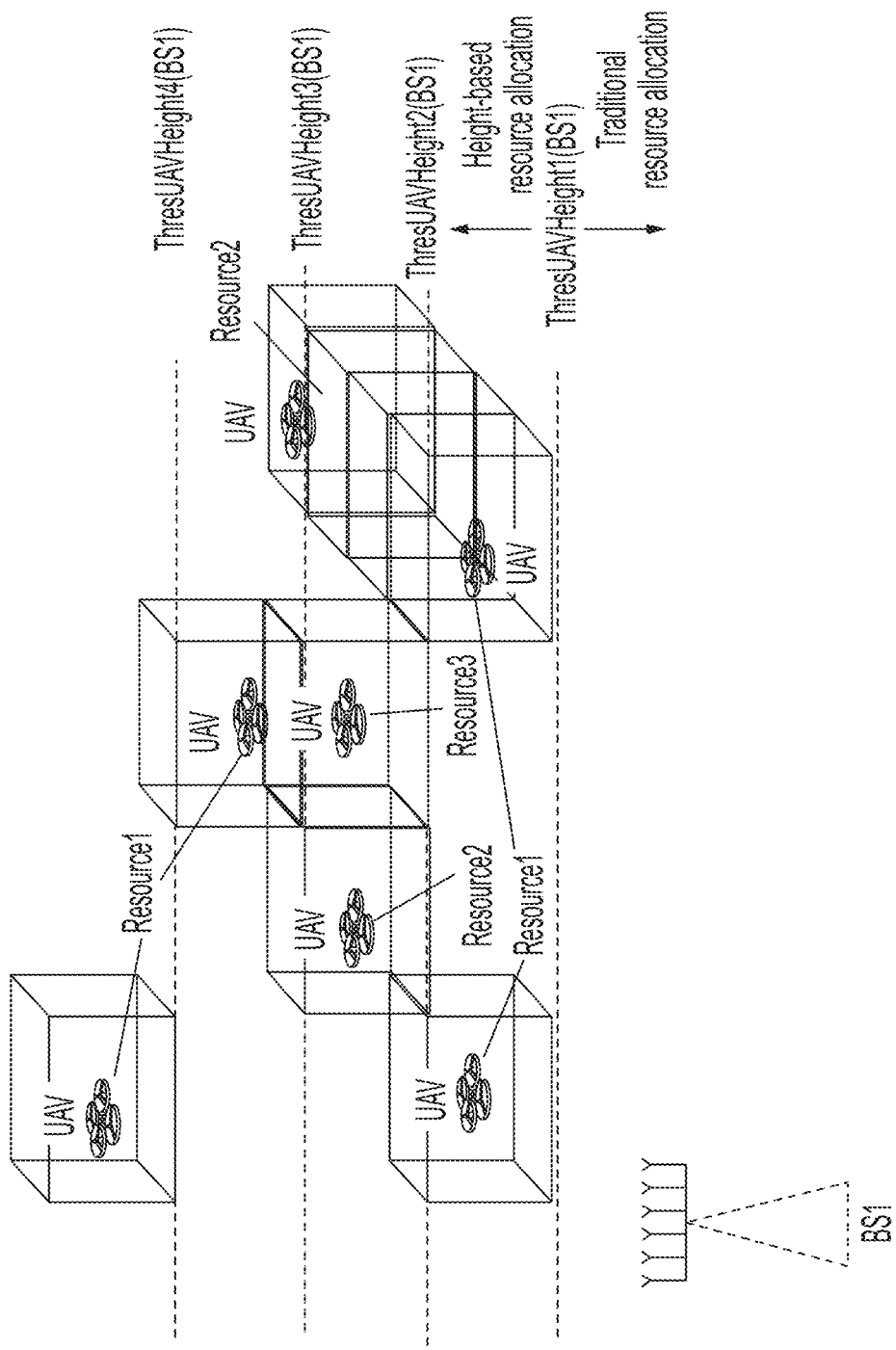
FIG. 30 is a schematic diagram showing an example of a resource allocation scheme based on a three-dimensional position according to an embodiment of the present disclosure.

FIG. 30 is a schematic diagram showing an example of the resource allocation scheme. As shown in FIG. 30, in a case that the resource allocation is performed, a more accurate resource allocation may be performed by considering the three-dimensional position information of the user equipment, thereby facilitating improving the resource utilization and reducing the interference. In this case, it is only required to determine whether the height of the user equipment is higher than the smallest height threshold to select an appropriate resource allocation scheme (a traditional resource allocation scheme or a height-based resource allocation scheme), and perform more accurate resource allocation by considering the relative distance between the two user equipments, regardless of the relationship between the height of the user equipment and the various height thresholds. It can be seen that this scheme is also applicable in the case where there is only one height threshold.

In addition, in a case that the resource allocation is performed, the resource allocation may also be optimized based on interference coordination with other base stations.

Preferably, the resource allocation unit 1404 may be configured to optimize resource allocation by performing interference coordination with an interfering base station according to interference report information from the user equipment.

With reference to FIG. 5 again, an example of the communication scenario is described. As shown in FIG. 5, it is assumed that the unmanned aerial vehicle UAV 3 flies from the coverage of the base station BS1 to the coverage of the base station BS2 while maintaining the flight height unchanged, but no handover occurs. In this case, the communication of the unmanned aerial vehicle UAV 3 on the time-frequency resource allocated by the base station BS1 may be interfered by the communication within the coverage of the base station BS2. Therefore, the unmanned aerial vehicle UAV 3 may report its interference information to the base station BS1, so that the base station BST may optimize the resource allocation to the unmanned aerial vehicle UAV 3 by performing interference coordination with the base station BS2.

Figure 31A:
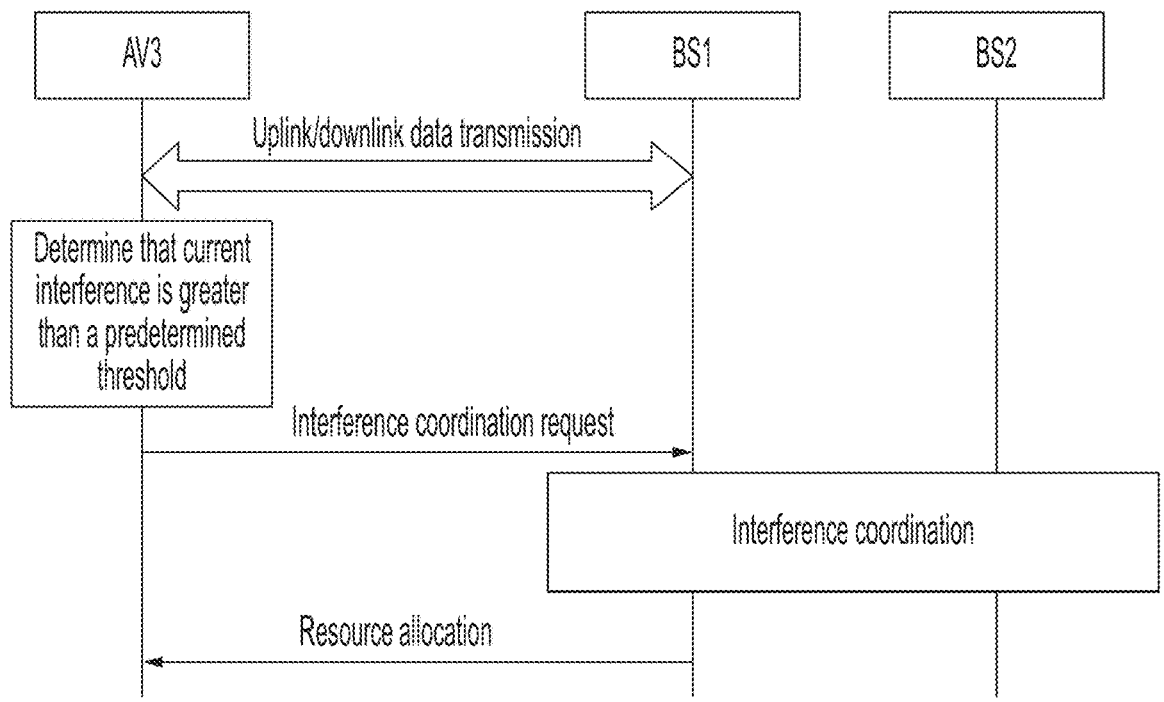
FIG. 31A is a flowchart showing an example of a signaling interaction process for optimizing resource allocation by interference coordination between base stations according to an embodiment of the present disclosure.

FIG. 31A is a flowchart showing a signaling interaction process in the example of the communication scenario.

As shown in FIG. 31A, in a case that the user equipment UAV3 determines that the current interference is too large and thus affects its communication performance, the user equipment UAV3 reports the interference related information to the base station BS1. As an example, the user equipment UAV3 may determine an interfering cell according to a measurement result of a cell specific reference signal (CRS), and include ID information of the interfering cell in an interference coordination request and transmit it to the base station BS1. After receiving the interference coordination request, the base station BS1 performs interference coordination with the base station BS2 that causes the interference, and adjusts the resource allocation result for the user equipment UAV3 according to an interference coordination result.

Figure 31B:
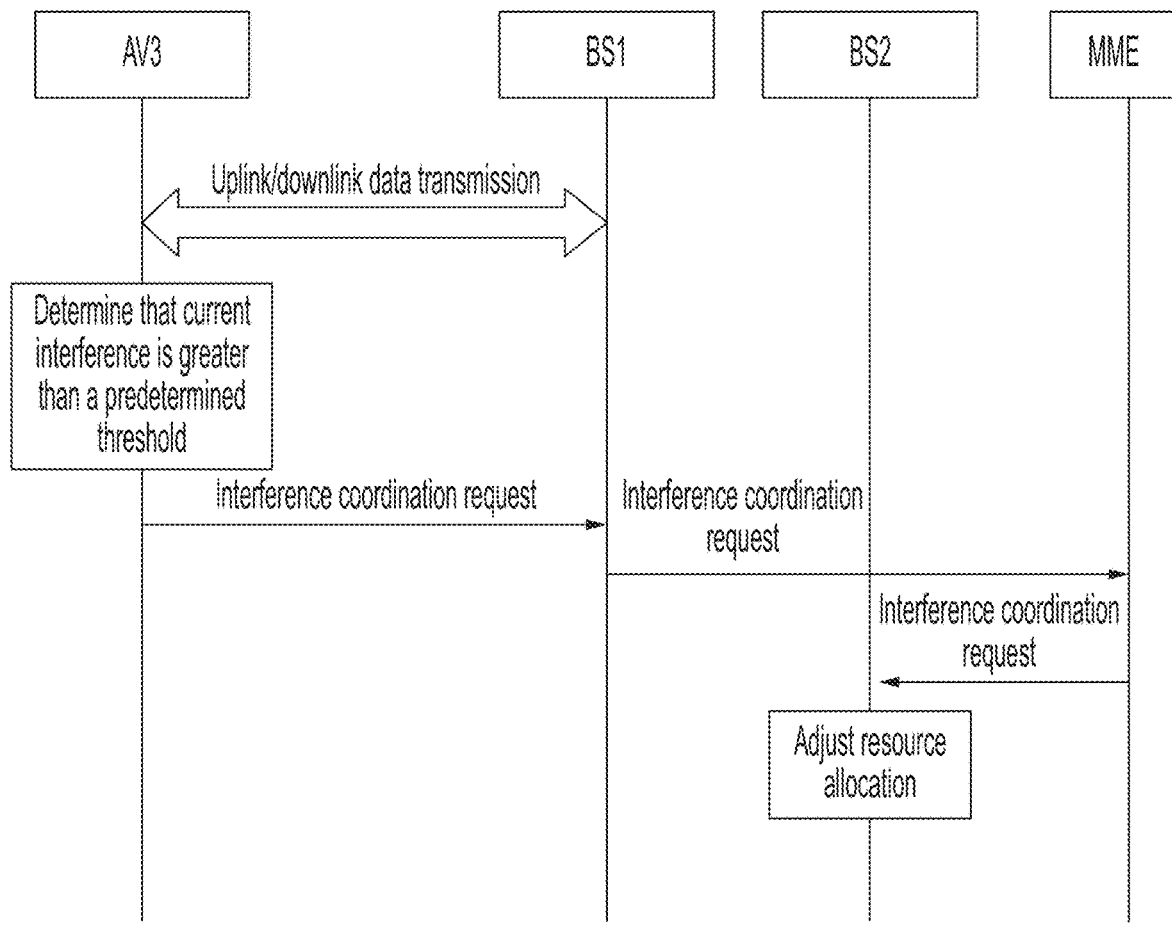
FIG. 31B is a flowchart showing another example of a signaling interaction process for optimizing resource allocation by interference coordination between base stations according to an embodiment of the present disclosure.

On the other hand, in a case that direct communication between the base station BS1 and the base station BS2 is impossible, the interference coordination request may be forwarded via the core network (for example, MME), and the base station BS2 may adjust the resource allocation within its coverage after receiving the interference coordination request to reduce interference to the user equipment UAV3. FIG. 31B shows the signaling interaction process in this case.

Moreover, preferably, the device 1400 may also assist in resource allocation in the case of a cell handover. Specifically, the device 1400 may directly or indirectly forward the acquired height information of the user equipment to a handover target base station in response to a handover request from the user equipment, for the handover target base station to perform resource allocation for the user equipment.

Figure 32:
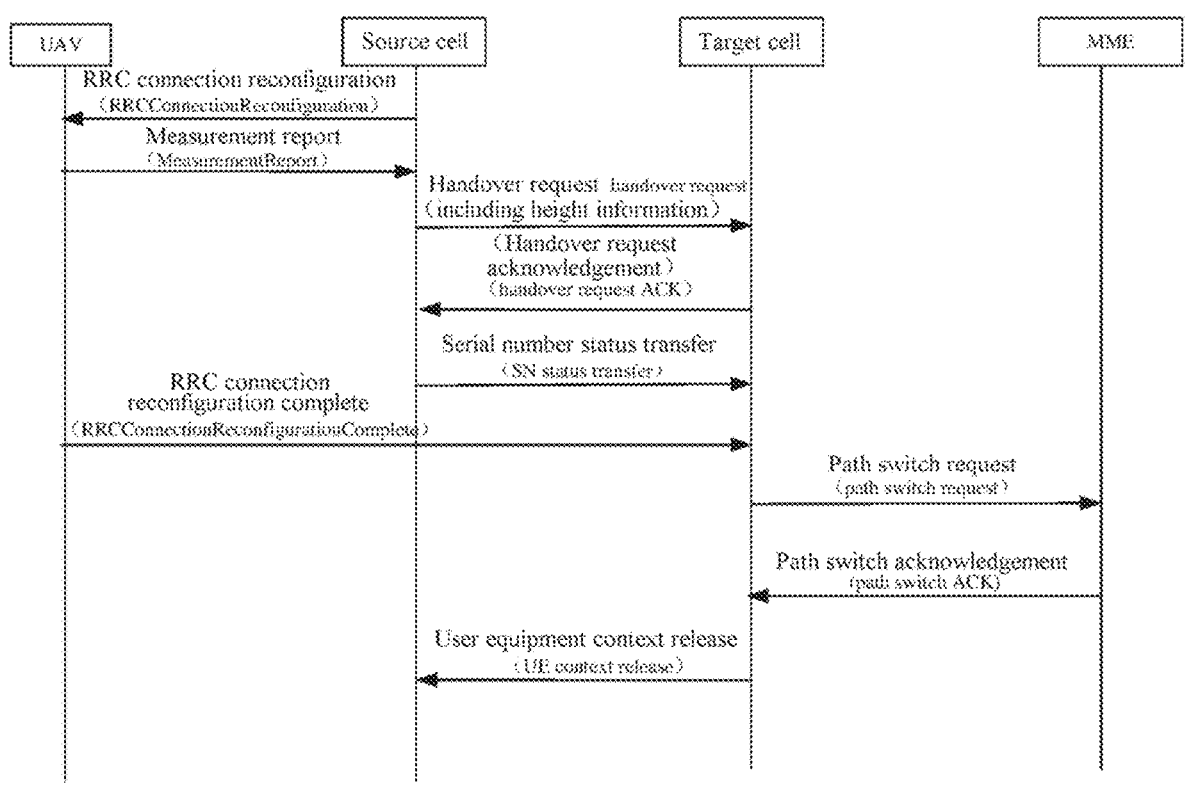
FIG. 32 is a flowchart showing a signaling interaction process for assisting resource allocation in a case of an X2-based handover.

FIG. 32 is a flowchart showing a signaling interaction process for assisting resource allocation in a case of an X2-based handover. As shown in FIG. 32, in the case of X2-based handover, a source cell and a target cell may communicate with each other directly, so that the source cell transmits the height information of the user equipment to the target cell in a handover request. The target cell may perform resource allocation according to the received height information and deliver the allocated resource to the user equipment.

Figure 33:
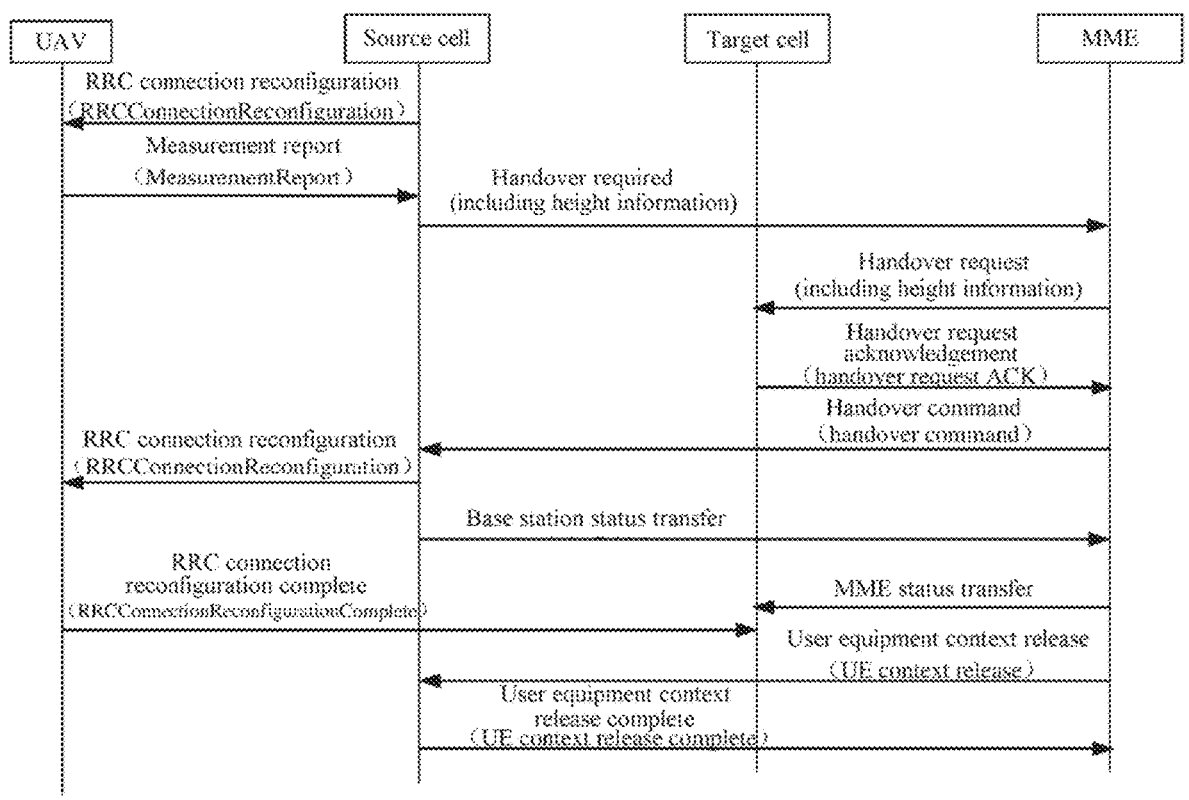
FIG. 33 is a flowchart showing a signaling interaction process for assisting resource allocation in a case of an S1-based handover.

FIG. 33 is a flowchart showing a signaling interaction process for assisting resource allocation in a case of an S1-based handover. As shown in FIG. 33, in the case of S1-based handover, the source cell and the target cell cannot directly communicate with each other, so that the source cell may transmit the height information of the user equipment to the core network (for example, the MME) by using, for example, handover required signaling, and the MME may in turn forward the height information to the target cell by using a handover request. Therefore, the target cell may perform resource allocation according to the received height information and deliver the allocated resource to the user equipment.

It is to be noted that although the signaling interaction in a case of handover is described above with reference to the flowcharts shown in FIGS. 32 and 33, this is given only to explain the principles of the present disclosure, where the illustrations and description not related to the technology of the present disclosure are omitted to avoid blurring, and those skilled in the art may make appropriate modifications to the signaling interaction process according to the principles of the present disclosure.

In addition, it is also to be noted that the device 1400 described with reference to FIG. 27 may be implemented at a chip level, or may be implemented at a device level by including other peripheral components. For example, the device 1400 may also operate as the base station itself, and may also include a communication unit (which is optional and indicated by a dashed box) for performing communication. For example, the communication unit may be used to perform communication with the user equipment, communication with the other base station, communication with the core network, and the like. In addition, it is to be further noted that the specific implementation of the communication unit is not limited here, and it may include one or more communication interface(s) for realizing communication with different external devices.

(3-2. Configuration Example at a User Equipment Side)

The base station may only allocate the time-frequency resource to a user equipment within its coverage, but cannot perform resource scheduling for a user equipment out of its coverage. The resource allocation schemes according to the present disclosure are described below for the in-coverage user equipment and the out-of-coverage user equipment, respectively.

(3-2-1. Configuration Example of an In-Coverage User Equipment)

Figure 34:
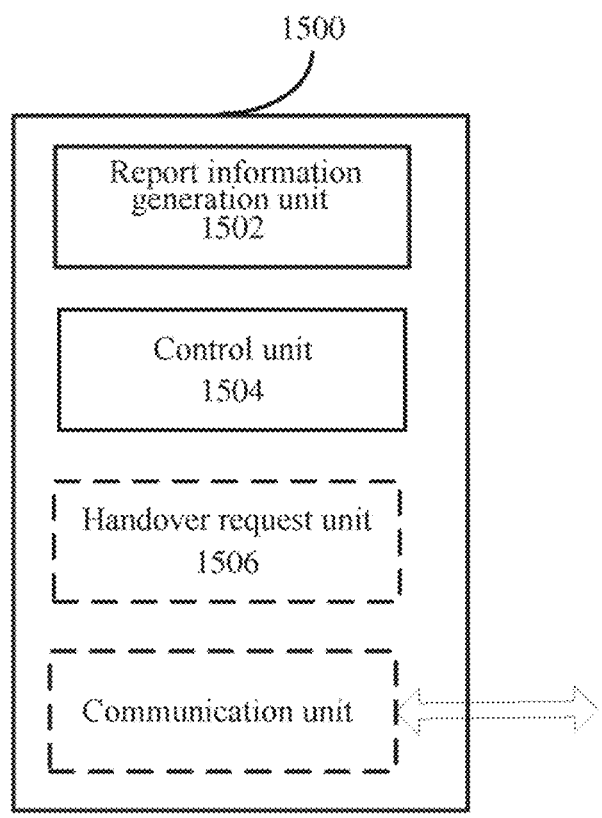
FIG. 34 is a block diagram showing a configuration example of a device at a user equipment side in a wireless communication system according to the third embodiment of the present disclosure.

FIG. 34 is a block diagram showing a configuration example of a device at a user equipment side in a wireless communication system according to the third embodiment of the present disclosure.

As shown in FIG. 34, a device 1500 according to the embodiment may include a report information generation unit 1502 and a control unit 1504.

Specifically, the report information generation unit 1502 may be configured to generate report information including at least height information of the user equipment, where the report information is to be sent to the base station, for the base station to perform resource allocation based on the height information and the one or more height thresholds. As an example, the report information may be included in the measurement report, uplink control information, or channel status information.

Preferably, the report information generation unit 1502 may be further configured to transmit the report information to the base station in a case that the current height of the user equipment is higher than the smallest height threshold to reduce signaling overhead and processing overhead.

Preferably, the report information may also include three-dimensional position information of the user equipment, rather than merely the height information, for the base station to perform more accurate resource allocation.

Preferably, the report information generation unit 1502 is further configured to generate interference report information related to interference in a case that the interference to the user equipment exceeds a predetermined threshold, wherein the interference report information is to be sent to the base station for the base station to optimize resource allocation to the user equipment by performing interference coordination with an interfering base station.

For a detailed description of the report information, reference may be made to the description at the corresponding part in the above embodiment of the base station side, which is not repeated here.

The control unit 1504 may be configured to control the user equipment to perform communication on a corresponding time-frequency resource according to a resource allocation result from the base station. Preferably, the control unit 1504 may acquire the resource allocation result from the uplink scheduling grant signaling UL grant or the downlink control information DCI from the base station.

Moreover, preferably, the device 1500 may further include a handover request unit 1506, which may be configured to generate a handover request in response to a predetermined triggering event, where the handover request is to be sent to the base station, so that the base station directly or indirectly forward the height information of the user equipment to a handover target base station according to the handover request, for the handover target base station to perform resource allocation for the user equipment.

It is to be noted that the configuration example of the in-coverage user equipment described here corresponds to the configuration example at the base station side described above with reference to FIGS. 27 to 33, and for the content which is not described in detail here, reference may be made to the description at the corresponding part above, which is not repeated here.

(3-2-2. Configuration Example of an Out-of-Coverage User Equipment)

Figure 35:
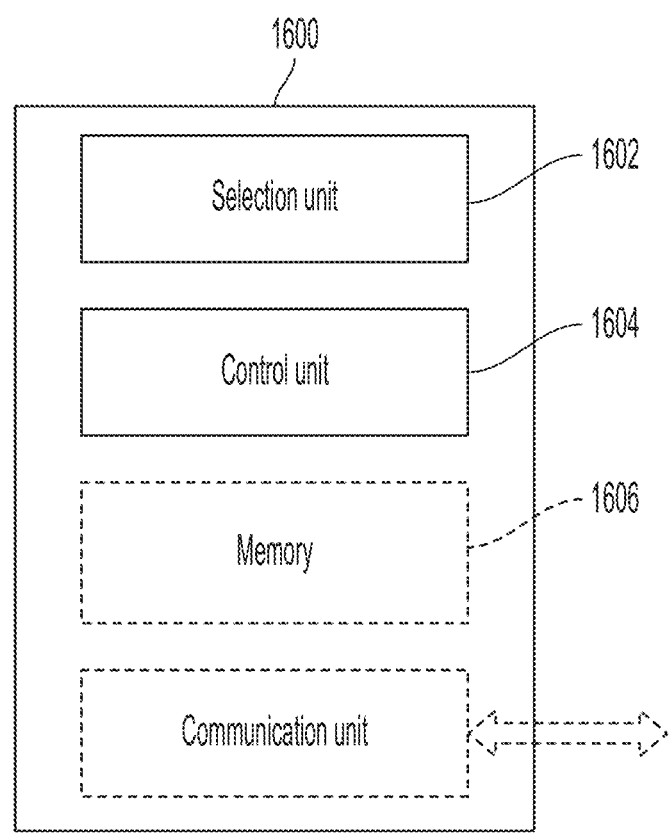
FIG. 35 is a block diagram showing another configuration example of the device at a user equipment side in a wireless communication system according to the third embodiment of the present disclosure.

FIG. 35 is a block diagram showing another configuration example of the device at a user equipment side in a wireless communication system according to the third embodiment of the present disclosure.

As shown in FIG. 35, a device 1600 according to the embodiment may include a selection unit 1602 and a control unit 1604.

The selection unit 1602 may be configured to select a time-frequency resource from a corresponding one of one or more pre-configured resource pools according to at least a current height of the user equipment and one or more height thresholds.

Since the out-of-coverage user equipment is not subjected to the resource scheduling of the base station, the user equipment may select by itself a time frequency resource from a pre-configured resource pool according to, for example, a height threshold pre-configured or received from other user equipment and the current height.

Figure 36:
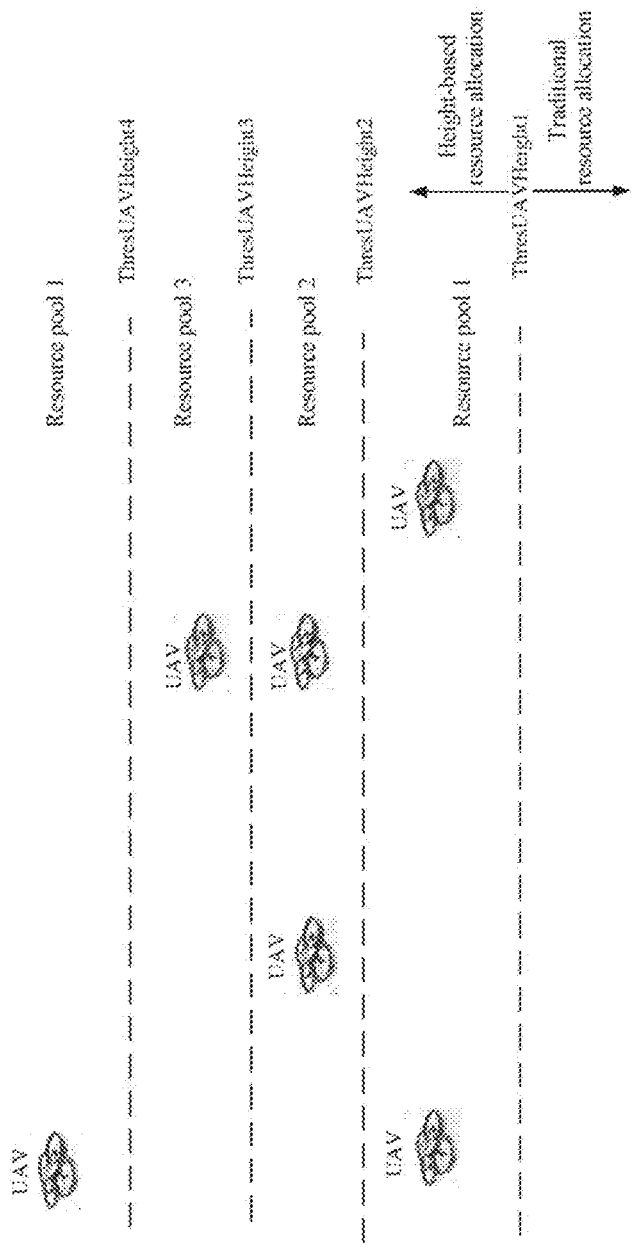
FIG. 36 is a schematic diagram showing an example of a resource pool division manner based on a height interval.

As an example, one or more resource pools are obtained by dividing based on one or more height thresholds. FIG. 36 is a schematic diagram showing an example of a resource pool division manner based on a height interval.

As shown in FIG. 36, the pre-configured resource pool is mapped to a corresponding height interval according to the height intervals divided based on the respective height thresholds. Preferably, for two height intervals that are far apart from each other, they may be mapped to the same resource pool to improve resource utilization. For example, as shown in FIG. 36, the uppermost height interval and the lowermost height interval may share a same resource pool 1.

In this case, the selection unit 1602 may be configured to first determine a height interval in which the user equipment is located, and then select a time-frequency resource from a corresponding resource pool according to a correspondence between the height intervals and the resource pools.

Figure 37:
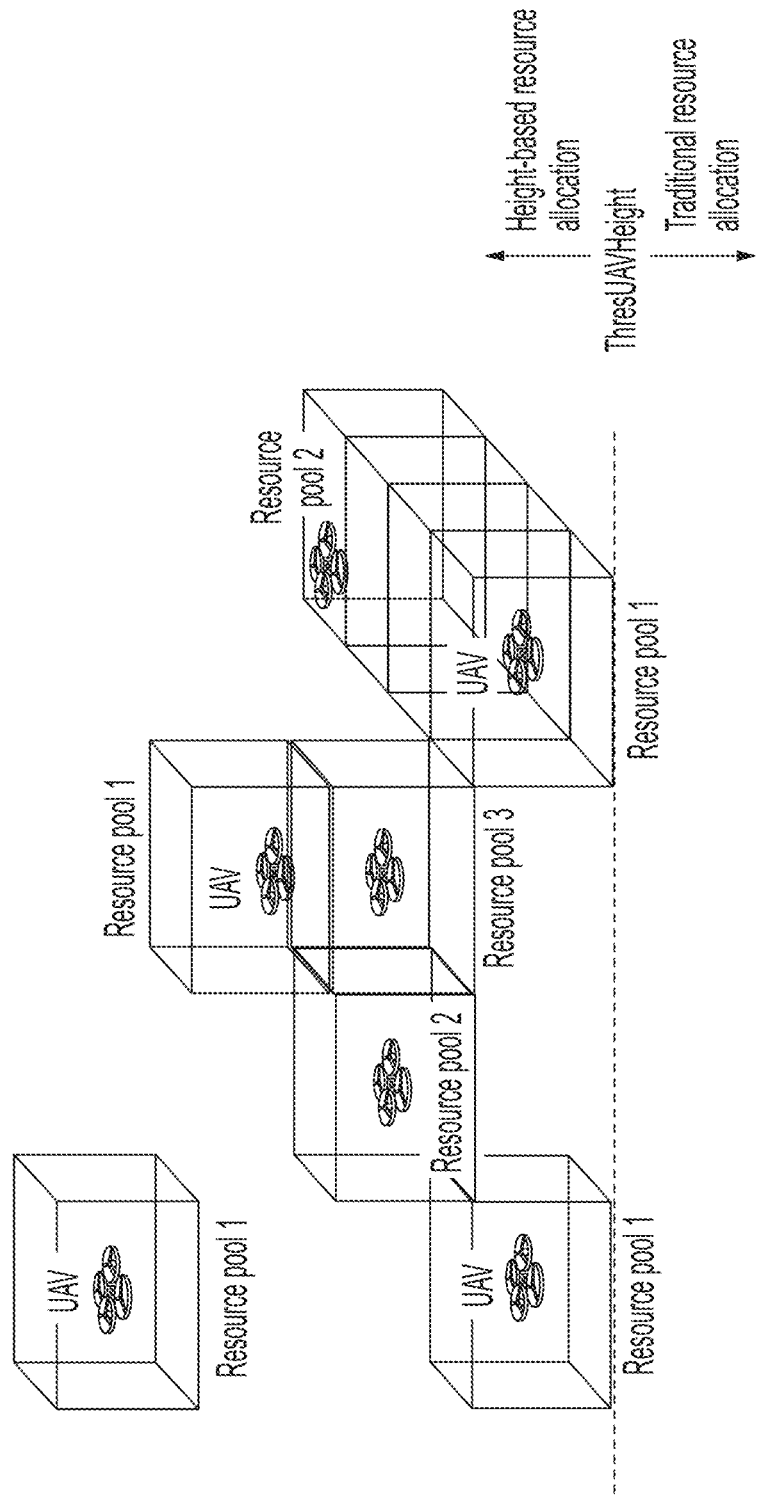
FIG. 37 is a schematic diagram showing an example of a resource pool division manner based on a three-dimensional space.

It may be understood that this resource pool division manner is a relatively simple one for the case that there are multiple height thresholds. It may be not applicable for a case that there is only one height threshold. Therefore, more generally, it may be considered to divide resource pools based on a three-dimensional space. FIG. 37 is a schematic diagram showing an example of a resource pool division manner based on a three-dimensional space.

As shown in FIG. 37, an entire space above the smallest height threshold is divided into multiple three-dimensional spaces in, for example, a cubic shape, and each three-dimensional space may correspond to a pre-configured resource pool. Preferably, two three-dimensional spaces that are far apart from each other (for example, a three-dimensional distance between the spaces is greater than a predetermined threshold) may be mapped to a same resource pool to improve resource utilization, as shown in FIG. 37.

It is to be noted that although FIG. 37 shows dividing the resource pools in a cubic shape, it is to be understood that this is merely exemplary rather than restrictive, and the division may also be performed in other shapes than a cubic shape (for example, a sphere).

In addition, it is to be noted that the volume of each three-dimensional space (for example, a side length of a cube, a radius of a sphere, and the like) may be pre-configured according to actual conditions, which is not specifically limited herein.

In this case, the selection unit 1602 may be configured to determine a three-dimensional space in which the user equipment is located according to a current three-dimensional position of the user equipment, and select a time-frequency resource from a corresponding resource pool according to a correspondence between the three-dimensional spaces and the resource pools.

In a case that a time-frequency resource is selected from a corresponding resource pool, the selection unit 1602 may randomly select the time-frequency resource from the corresponding resource pool, but there is a possibility that a conflict occurs. Alternatively, the selection unit 1602 may also perform listening before the selection, that is, to determine whether the time-frequency resource is occupied by another user equipment, to reduce the occurrence of conflicts, which may increase power consumption of the user equipment.

Moreover, preferably, the occurrence of such conflicts may also be avoided by reasonably configuring the resource pool. For example, if the density of UAVs in a space area is large, a large resource pool may be allocated to the space area to reduce conflict.

Preferably, the device 1600 may also include a memory 1606 that may store information related to one or more resource pools. For example, the memory 1606 may store the pre-configured height threshold, a correspondence between the height interval and the resource pool, a correspondence between the three-dimensional space and the resource pool, and the like, so that the selection unit 1602 selects a time-frequency resource according to position information of the user equipment by reading related information from the memory 1606.

It is to be noted that the device 1500 described above with reference to FIG. 34 and the device 1600 described above with reference to FIG. 35 may be implemented at a chip level, or may be implemented at a device level by including other peripheral components. For example, the devices 1500 and 1600 may also operate as the user equipment itself, and may also include a communication unit (which is optional and indicated by a dashed box) for performing communication. For example, the communication unit may be used to perform communication with the base station, communication with the other user equipment, and the like. In addition, it is to be further noted that the specific implementation of the communicating unit is not limited here, and it may include one or more communication interface(s) for realizing communication with different external devices.

It is to be noted that the various functional units described above with reference to FIGS. 27, 34, and 35 are merely logical modules divided according to the specific functions thereof, and are not intended to limit the specific implementations. In the actual implementation, the functional units and modules may be implemented as separated physical entities, or may be implemented by a single entity (e.g., a processor (CPU, DSP or the like), an integrated circuit or the like).

In addition, it is to be noted that although the device embodiments (including the device at a base station side and the device at a user equipment side) of the present disclosure are described above with reference to the drawings, they are exemplary rather than restrictive. Those skilled in the art may modify the shown examples of the functional configurations according to the principles of the present disclosure. For example, various functional modules in the embodiment may be added, deleted, modified, combined or the like, and all of such modifications are considered to fall within the scope of the present disclosure.

(3-3. Method Embodiment)

Corresponding to the above device embodiments, method embodiments are further provided according to the present disclosure below.

Figure 38:
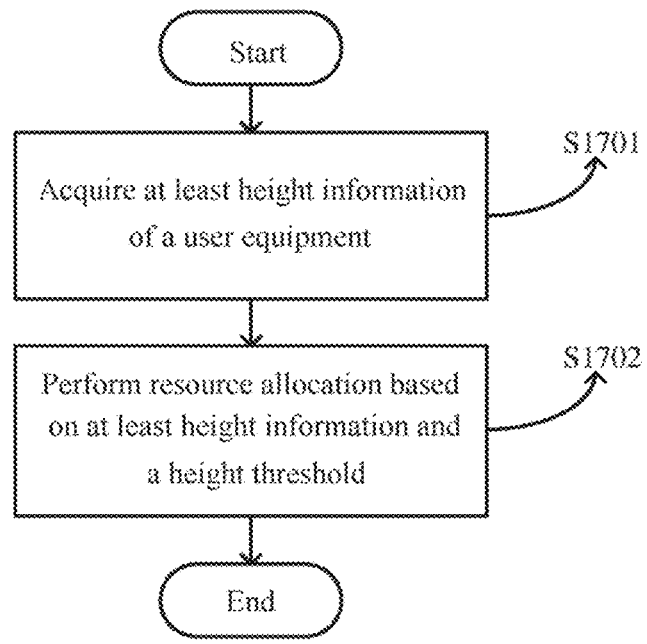
FIG. 38 is a flowchart showing a process example of a method at a base station side in a wireless communication system according to the third embodiment of the present disclosure.

FIG. 38 is a flowchart showing a process example of a method at a base station side in a wireless communication system according to the third embodiment of the present disclosure.

As shown in FIG. 38, the method according to the embodiment starts at step S1701. In step S1701, at least height information of each of one or more user equipments is acquired.

Then, the method proceeds to step S1702. In step S1702, resource allocation is performed for each user equipment based on at least height information of the user equipment and one or more height thresholds for the user equipment.

It is to be noted that the method embodiment described herein corresponds to the device embodiment at the base station side described above with reference to FIG. 27, and for content which are not described in detail here, reference may be made to the above description at the corresponding part, which is not repeated here.

Figure 39:
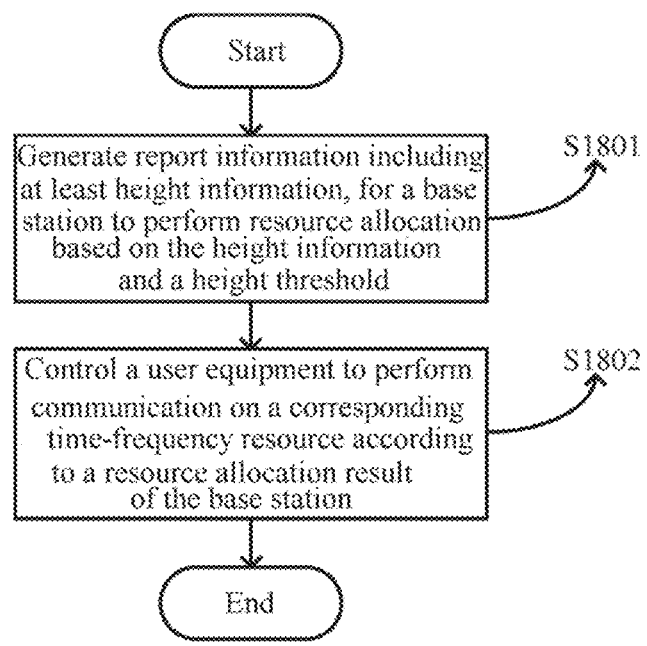
FIG. 39 is a flowchart showing a process example of a method at a user equipment side in a wireless communication system according to the third embodiment of the present disclosure.

FIG. 39 is a flowchart showing a process example of a method at a user equipment side in a wireless communication system according to the third embodiment of the present disclosure.

As shown in FIG. 39, the method according to the embodiment starts at step S1801. In step S1801, report information including at least height information of the user equipment is generated, and the report information is to be sent to the base station for the base station to perform resource allocation based on the height information and the one or more height thresholds.

Then, the method proceeds to step S1802. In step S1802, according to a resource allocation result of the base station, the user equipment is controlled to perform communication on a corresponding time-frequency resource.

It is to be noted that the method embodiment described herein corresponds to the embodiment of the in-coverage user equipment described above with reference to FIG. 34, and for content which is not described in detail here, reference may be made to the above description at the corresponding part, which is not repeated here.

Figure 40:
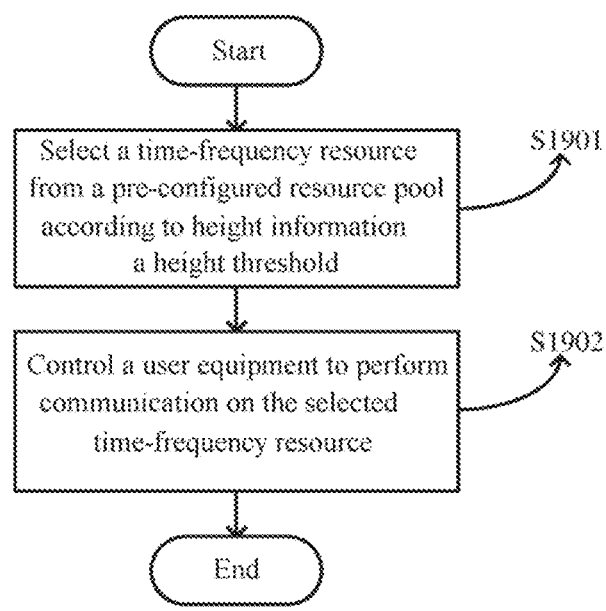
FIG. 40 is a flowchart showing another process example of the method at a user equipment side in a wireless communication system according to the third embodiment of the present disclosure.

FIG. 40 is a flowchart showing another process example of the method at a user equipment side in a wireless communication system according to the third embodiment of the present disclosure.

As shown in FIG. 40, the method according to the embodiment starts at step S1901. In step S1901, a time-frequency resource is selected from a corresponding one of one or more pre-configured resource pools according to at least a current height of the user equipment and one or more height thresholds.

Then, the method proceeds to step S1902. In step S1902, the user equipment is controlled to perform communication on the selected time-frequency resource.

It is to be noted that the method embodiment described herein corresponds to the embodiment of the out-of-coverage user equipment described above with reference to FIG. 35, and for content which is not described in detail here, reference may be made to the above description at the corresponding part, which is not repeated here.

In addition, it is to be understood that the above flow charts shown in FIGS. 38 to 40 are exemplary rather than restrictive. Those skilled in the art may modify the illustrated processing flow examples according to the principles of the present disclosure. For example, various steps in the embodiment may be added, deleted, modified, combined or the like, and all of such modifications are considered to fall within the scope of the present disclosure.

According to the third embodiment of the present disclosure described above, the resource allocation may be performed based on the height information and the height threshold for the user equipment, which may optimize the resource allocation in the UAV communication scenario, thereby improving the resource utilization and reducing the interference.

Although the first to third embodiments of the present disclosure are separately described above for ease of understanding, this does not mean that these embodiments are completely independent or mutually exclusive from each other. In practice, according to actual needs, those skilled in the art may make appropriate modifications or combinations to the above embodiments according to the principles of the present disclosure, and all of these modifications or combinations are considered to fall within the scope of the present disclosure.

It is to be understood that the storage medium and the machine-executable instructions in a program product according to an embodiment of the present disclosure may be configured to perform methods corresponding to the above device embodiments, and thus for the content which is not described in detail here, reference may be made to the above description at a corresponding part, which is not repeated here.

Accordingly, a storage medium for carrying the program product which includes the machine-readable instruction codes is further provided according to the present disclosure. The storage medium includes, but is not limited to, a floppy disk, an optical disk, a magneto-optical disk, a memory card, a memory rod and the like.

Figure 41:
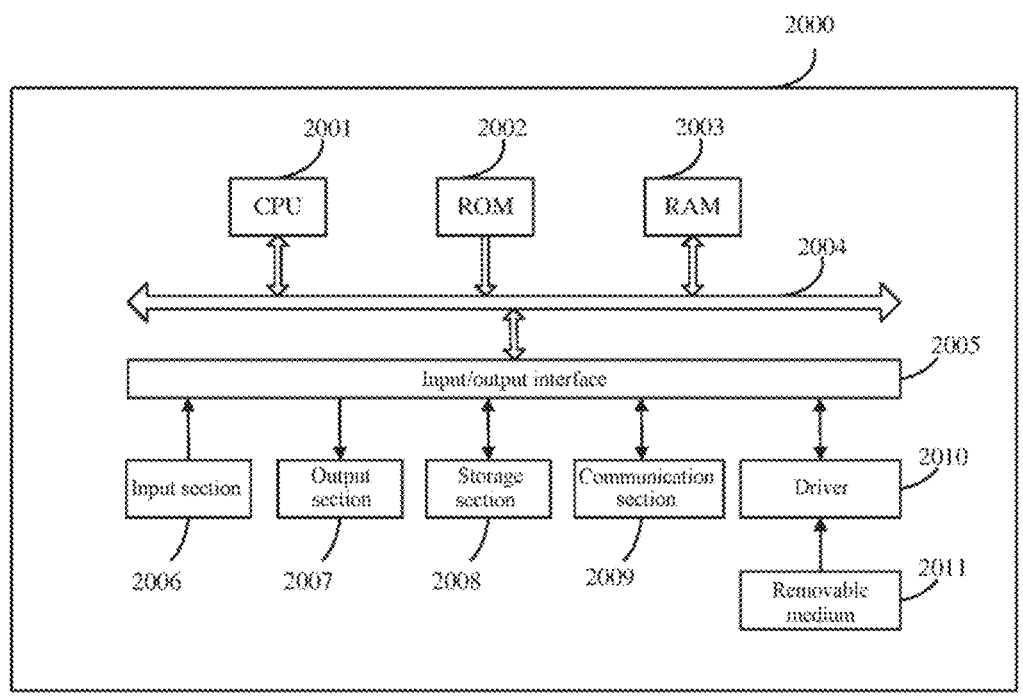
FIG. 41 is a block diagram showing an example structure of a personal computer which can be used as an information processing device in an embodiment of the present disclosure.

4. Computing Device for Implementing the Embodiments of the Device and the Method According to the Present Disclosure In addition, it is further to be noted that the above-described series of processing and devices may also be implemented by software and/or firmware. In the case of implementation in software and/or firmware, a program constituting the software is installed from a storage medium or a network to a computer with a dedicated hardware structure, e.g., a general purpose personal computer 2000 illustrated in FIG. 41, which may perform various functions when various programs are installed thereon. FIG. 41 is a block diagram showing an exemplary structure of a personal computer that may be used as an information processing device according to an embodiment of the present disclosure.

In FIG. 41, a central processing unit (CPU) 2001 executes various processes according to the program stored in a read only memory (ROM) 2002 or the program loaded from the storage section 2008 to a random access memory (RAM) 2003. In the RAM 2003, the data required by CPU 2001 to execute various processing is also stored as necessary.

The CPU 2001, the ROM 2002 and the RAM 2003 are connected with each other via a bus 2004. An input/output interface 2005 is also connected to the bus 2004.

The following sections are connected to the input/output interface 2005: an input section 2006 including a keyboard, a mouse and the like; an output section 2007 including a display such as a cathode ray tube (CRT), a liquid crystal display (LCD) and the like, a loudspeaker, and the like; a memory section 2008 including a hard disc and the like; and a communication section 2009 including a network interface card such as a LAN card, a modem and the like. The communication section 2009 performs communication processing via a network such as the Internet.

A driver 2010 may also be connected to the input/output interface 2005 as needed. A removable medium 2011, e.g., a magnetic disk, an optical disk, an magneto optical disk, a semiconductor memory, etc., may be installed on the driver 2010 as needed so that a computer program fetched therefrom may be installed into the storage section 2008 as needed.

In the case that the above series of processes are performed in software, a program constituting the software is installed from a network, e.g., the Internet, or a storage medium, e.g., the removable medium 2011.

It is to be understood by those skilled in the art that the storage medium is not limited to the removable medium 2011 shown in FIG. 41 in which the program is stored and which is distributed separately from the device so as to provide the program to the user. The removable medium 2011, for example, may include a magnetic disk including a Floppy Disk (registered trademark); an optical disk including a Compact Disk Read Only Memory (CD-ROM) and a Digital Versatile Disc (DVD); a magneto-optical disk including a MiniDisc (MD) (registered trademark); and a semiconductor memory. Alternatively, the storage medium may be a ROM 2002, a hard disk included in the storage section 2008, etc., which has a program stored therein and is distributed to the user along with a device in which it is incorporated.

5. Application Examples of the Technology According to the Present Disclosure The technology of the present disclosure may be applied to various products. For example, the base station described in the present disclosure may be realized as an evolved Node B (eNB) of any type, such as a macro eNB and a small eNB. The small eNB may be an eNB such as a pico eNB, a micro eNB and a home (femto) eNB that covers a cell smaller than a macro cell. Alternatively, the base station may also be implemented as a base station of any other type, such as a NodeB and a base transceiver station (BTS). The base station may include a main body (that is also referred to as a base station device) configured to control wireless communication, and one or more remote radio heads (RRH) disposed in a different place from the main body. In addition, various types of terminals, which will be described below, may each operate as the base station by temporarily or semi-persistently executing a base station function.

Application examples according to the present disclosure are described below with reference to FIGS. 42 to 43.

First Application Example

Figure 42:
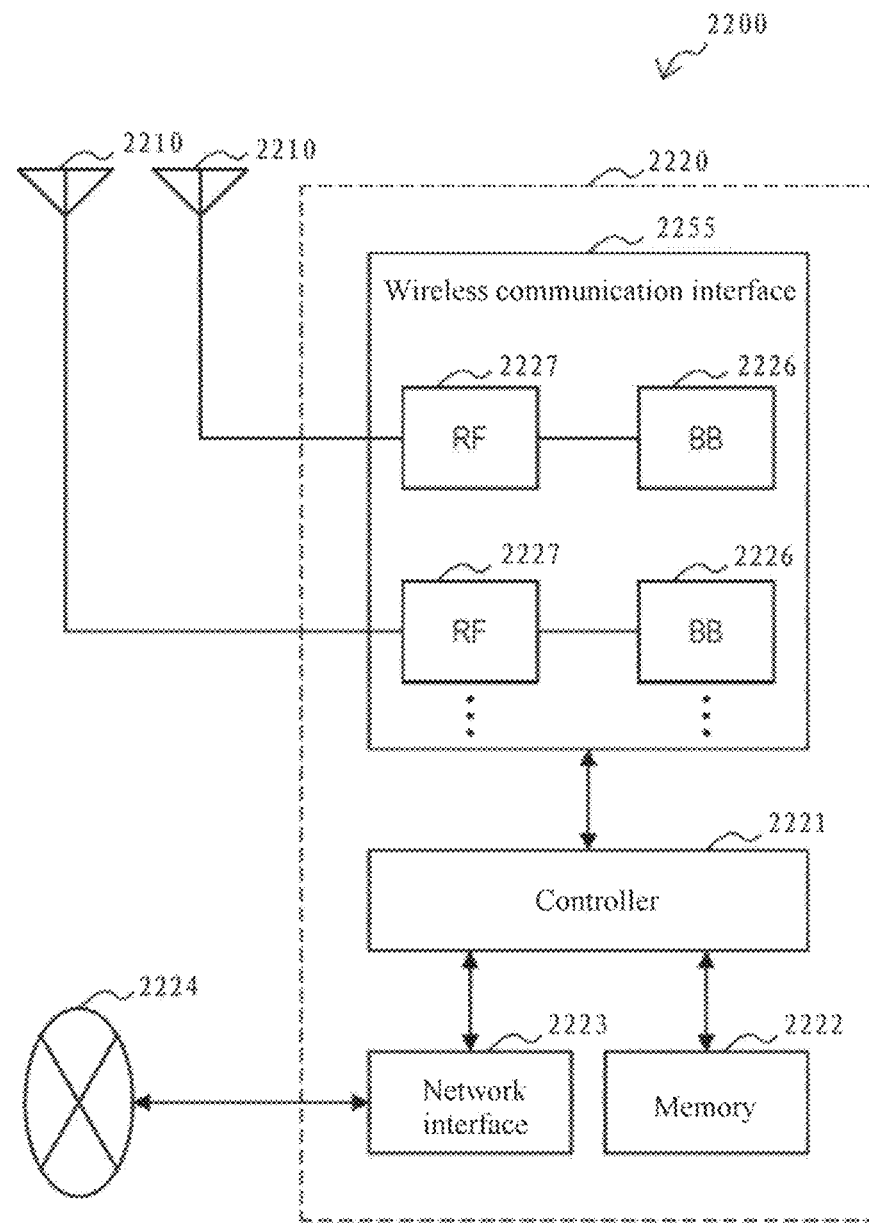
FIG. 42 is a block diagram showing a first example of a schematic configuration of an evolved Node B (eNB) to which the technology of the present disclosure may be applied.

FIG. 42 is a block diagram showing a first example of a schematic configuration of an eNB to which the technology of the present disclosure may be applied. An eNB 2200 includes one or more antennas 2210 and a base station device 2220. The base station device 2220 and each of the antennas 2210 may be connected with each other via an RF cable.

Each of the antennas 2210 includes one or more antenna elements (such as multiple antenna elements included in a multiple-input multiple-output (MIMO) antenna), and is used for transmitting and receiving a radio signal by the base station device 2220. The eNB 2200 may include the multiple antennas 2210, as shown in FIG. 42. For example, the multiple antennas 2210 may be compatible with multiple frequency bands used by the eNB 2200. Although FIG. 42 illustrates an example in which the eNB 2200 includes multiple antennas 2210, the eNB 2200 may also include a single antenna 2210.

The base station device 2220 includes a controller 2221, a memory 2222, a network interface 2223, and a wireless communication interface 2225.

The controller 2221 may be a CPU or a DSP and control various functions of higher layers of the base station device 2220. For example, the controller 2221 generates a data packet based on data in a signal processed by the wireless communication interface 2225, and transfers the generated packet via a network interface 2223. The controller 2221 may bundle data from multiple baseband processors to generate bundled packet, and transfer the generated bundled packet. The controller 2221 may have logical functions of performing control such as radio resource control, radio bearer control, mobility management, admission control, and scheduling. The control may be performed in conjunction with an adjacent eNB or a core network node. The memory 2222 includes RAM and ROM, and stores a program that is executed by the controller 2221, and various types of control data (such as a terminal list, transmission power data, and scheduling data).

The network interface 2223 is a communication interface for connecting the base station device 2220 to a core network 2224. The controller 2221 may communicate with a core network node or another eNB via the network interface 2223. In that case, the eNB 2200 and the core network node or the other eNB may be connected to each other through a logical interface (such as an S1 interface and an X2 interface). The network interface 2223 may also be a wired communication interface or a wireless communication interface for radio backhaul. If the network interface 2223 is a wireless communication interface, it may use a higher frequency band for wireless communication than a frequency band used by the wireless communication interface 2225.

The wireless communication interface 2225 supports any cellular communication scheme (such as Long Term Evolution (LTE) and LTE-Advanced), and provides wireless connection to a terminal positioned in a cell of the eNB 2200 via the antenna 2210. The wireless communication interface 2225 may typically include, for example, a base band (BB) processor 2226 and an RF circuit 2227. The BB processor 2226 may perform, for example, coding/decoding, modulation/demodulation and multiplexing/de-multiplexing, and perform various types of signal processes of the layers (for example L1, media access control (MAC), radio link control (RLC) and packet data convergence protocol (PDCP)). Instead of the controller 2221, the BB processor 2226 may have a part or all of the above-described logical functions. The BB processor 2226 may be a memory that stores the communication control program, or a module that includes a processor and related circuitry configured to perform the program. In this way, the function of the BB processor 2226 may be changed when the programs are updated. The module may be a card or a blade that is inserted into a slot of the base station device 2220. Alternatively, the module may be a chip that is mounted on the card or the blade. Meanwhile, the RF circuit 2227 may include, for example, a frequency mixer, a filter and an amplifier, and transmit and receive a radio signal via the antenna 2210.

As shown in FIG. 42, the wireless communication interface 2225 may include multiple BB processors 2226. For example, multiple BB processors 2226 may be compatible with multiple frequency bands used by the eNB 2200. As shown in FIG. 42, the wireless communication interface 2225 may include multiple RF circuits 2227. For example, the multiple RF circuits 2227 may be compatible with multiple antenna elements. Although an example in which the wireless communication interface 2225 includes multiple BB processors 2226 and multiple RF circuits 2227 is shown in FIG. 22, the wireless communication interface 2225 may also include a single BB processor 2226 or a single RF circuit 2227.

Second Application Example

Figure 43:
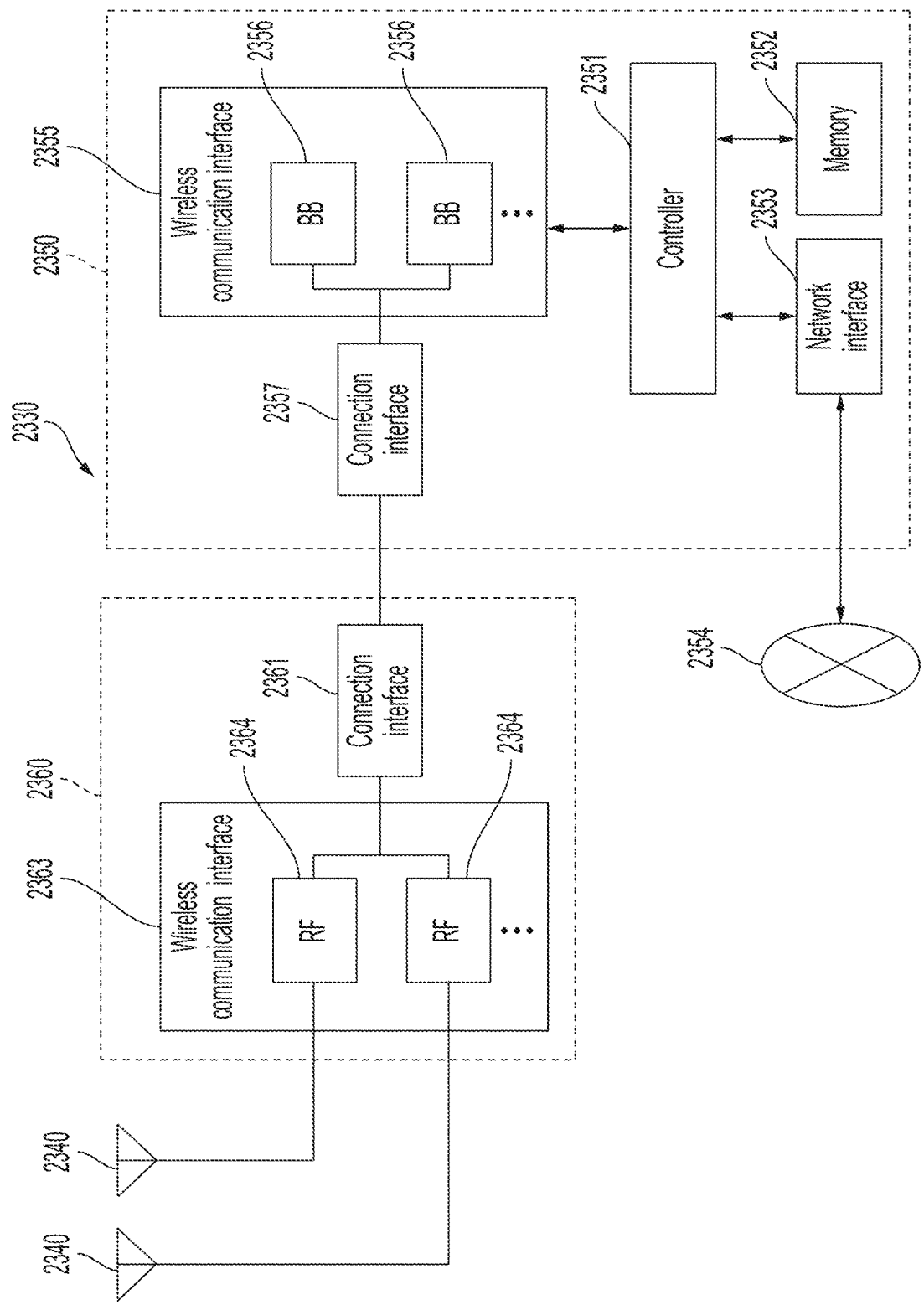
FIG. 43 is a block diagram showing a second example of a schematic configuration of an eNB to which the technology of the present disclosure may be applied.

FIG. 43 is a block diagram showing a second example of a schematic configuration of an eNB to which the technology according to the present disclosure may be applied. An eNB 2330 includes one or more antennas 2340, a base station device 2350 and an RRH 2360. Each antenna 2340 and the RRH 2360 may be connected to each other via an RF cable. The base station device 2350 and the RRH 2360 may be connected to each other via a high-speed line such as a fiber cable.

Each of the antennas 2340 includes one or more antenna elements (such as the multiple antenna elements included in the MIMO antenna), and is used for transmitting and receiving the radio signal by the RRH 2360. As shown in FIG. 43, the eNB 2330 may include multiple antennas 2340. For example, the multiple antennas 2340 may be compatible with multiple frequency bands used by the eNB 2330. Although an example in which the eNB 2330 includes multiple antennas 2340 is shown in FIG. 43, the eNB 2330 may also include a single antenna 2340.

The base station device 2350 includes a controller 2351, a memory 2352, a network interface 2353, a wireless communication interface 2355, and a connection interface 2357. The controller 2351, the memory 2352, and the network interface 2353 are the same as the controller 2221, the memory 2222, and the network interface 2223 described with reference to FIG. 42.

The wireless communication interface 2355 supports any cellular communication solution (such as LTE and LTE-advanced), and provides wireless communication with a terminal located in a sector corresponding to the RRH 2360 via the RRH 2360 and the antenna 2340. The wireless communication interface 2355 may typically include, for example, a BB processor 2356. Other than connecting to an RF circuit 2364 of the RRH 2360 via the connection interface 2357, the BB processor 2356 is the same as the BB processor 2226 described with reference to FIG. 42. As show in FIG. 43, the wireless communication interface 2355 may include multiple BB processors 2356. For example, the multiple BB processors 2356 may be compatible with the multiple frequency bands used by the eNB 2330. Although FIG. 43 illustrates an example in which the wireless communication interface 2355 includes multiple BB processors 2356, the wireless communication interface 2355 may also include a single BB processor 2356.

The connection interface 2357 is an interface for connecting the base station device 2350 (the wireless communication interface 2355) to the RRH 2360. The connection interface 2357 may also be a communication module for communication in the above-described high-speed line that connects the base station device 2350 (the wireless communication interface 2355) to the RRH 2360.

The RRH 2360 includes a connection interface 2361 and a wireless communication interface 2363.

The connection interface 2361 is an interface for connecting the RRH 2360 (the wireless communication interface 2363) to the base station device 2350. The connection interface 2361 may also be a communication module for the communication in the above high-speed line.

The wireless communication interface 2363 transmits and receives a radio signal via the antenna 2340. The wireless communication interface 2363 may generally include, for example, the RF circuit 2364. The RF circuit 2364 may include, for example, a frequency mixer, a filter and an amplifier, and transmit and receive a radio signal via the antenna 2340. The wireless communication interface 2363 may include multiple RF circuits 2364, as shown in FIG. 43. For example, the multiple RF circuits 2364 may support multiple antenna elements. Although FIG. 43 illustrates the example in which the wireless communication interface 2363 includes the multiple RF circuits 2364, the wireless communication interface 2363 may also include a single RF circuit 2364.

In the eNB 2200 shown in FIG. 42 and the eNB 2330 shown in FIG. 43, the communication unit in the above device at a base station side described in the first to three embodiments may be implemented by the wireless communication interface 2225 and the wireless communication interface 2355 and/or the wireless communication interface 2363. At least part of the functions of the above device at a base station side described in the first to three embodiments may also be realized by the controller 2221 and the controller 2351.

Preferred embodiments of the disclosure have been described above with reference to the drawings, but the disclosure is not limited to the above examples of course. Those skilled in the art may make various changes and modifications within the scope of the appended claims, and it is to be understood that such changes and modifications naturally fall within the technical scope of the present disclosure.

For example, elements shown in dashed boxes in the functional block diagrams shown in the drawings indicate that the functional units are optional in the respective device, and the various optional functional units may be combined in a suitable manner to achieve the desired function.

For example, multiple functions of one unit in the above embodiment may be realized by separate devices. Alternatively, multiple functions implemented by multiple units in the above embodiments may be respectively implemented by separate devices. Furthermore, one of the above functions may be implemented by multiple units. Needless to say, such configurations are included in the technical scope of the present disclosure.

In the specification, steps described in the flowchart include not only the processing performed chronologically, but also the processing performed in parallel or individually rather than chronologically. Further, even in the steps processed chronically, without saying, the order may be appropriately changed.

Although the present disclosure and its advantages have been described in detail, it is to be understood that various changes, substitutions and alterations may be made without departing from the spirit and scope of the disclosure as defined by the appended claims. Moreover, the term "include", "comprise" or any variant thereof in the embodiments of the present disclosure is intended to encompass nonexclusive inclusion, so that a process, a method, an article or a device including a series of elements includes not only those elements but also other elements that are not expressively listed or an element) inherent to the process, the method, the article or the device. The elements defined by the statement "comprising one . . . " do not exclude that there are other identical elements in the process, method, article, or device that includes the elements, if not specifically limited otherwise.

The invention claimed is:

1. A device in a wireless communication system, the device comprising processing circuitry configured to:
configure operation of a user equipment based on one or more height thresholds for the user equipment and a current height of the user equipment directly or indirectly;
generate measurement configuration information for the user equipment, so that the user equipment reports information related to the current height based on the measurement configuration information; and
receive the information related to the current height from the user equipment reported in response to a condition that the current height is higher than a smallest height threshold of the one or more height thresholds.

2. The device according to claim 1, wherein the information related to the current height is reported by the user equipment periodically, non-periodically or based on event triggering.

3. The device according to claim 1, wherein the processing circuitry is further configured to:
instruct the user equipment to turn on a flying mode or apply a related operation in the flying mode to the user equipment, if the current height is higher than the smallest height threshold of the one or more height thresholds.

4. The device according to claim 3, wherein the processing circuitry is further configured to:
instruct the user equipment to turn off the flying mode or apply a related operation in a hovering mode to the user equipment, if the current height is lower than or equal to the smallest height threshold of the one or more height thresholds.

5. The device according to claim 3, wherein the processing circuitry is further configured to:
configure, in response to a request made by the user equipment based on the one or more height thresholds and the current height, the operation of the user equipment, and
wherein configuring the operation of the user equipment comprises instructing the user equipment to turn on the flying mode or applying a related operation in the flying mode to the user equipment, and the request comprises a request made by the user equipment in a case that the current height is higher than the smallest height threshold of the one or more height thresholds.

6. The device according to claim 5, wherein the processing circuitry is further configured to:
instruct the user equipment to turn off the flying or apply a related operation in a hovering mode to the user equipment, in response to a request made by the user equipment in a case that the current height is lower than or equal to the smallest height threshold of the one or more height thresholds.

7. A device in a wireless communication system, the device comprising processing circuitry configured to:
generate information directly or indirectly related to a current height of a user equipment, in response to measurement configuration information generated by a base station, the information being to be sent to the base station for the base station to configure operation of the user equipment based on the information and one or more height thresholds for the user equipment; and
report the information related to the current height of the user equipment in response to a condition that the current height is higher than a smallest height threshold of the one or more height thresholds.

8. The device according to claim 7, wherein the processing circuitry is further configured to:
report, based on the measurement configuration information from the base station, the information directly related to the current height periodically, non-periodically or based on event triggering.

9. The device according to claim 7, wherein the processing circuitry is further configured to:
generate a request for turning on a flying mode or applying an operation in the flying mode, if the current height is higher than the smallest height threshold of the one or more height thresholds.

10. The device according to claim 9, wherein the processing circuitry is further configured to:
generate, based on the one or more height thresholds and the current height, a request regarding the flying mode and a hovering mode as the information indirectly related to the current height.

11. The device according to claim 9, wherein the processing circuitry is further configured to:
generate a request for turning off the flying mode or applying an operation in the hovering mode, if the current height is lower than or equal to the smallest height threshold of the one or more height thresholds.

12. The device according to claim 9, wherein the processing circuitry is further configured to:
turn on or turn off the flying mode in response to the instruction from the base station.

13. The device according to claim 9, wherein the processing circuitry is further configured to:
turn on or turn off the flying mode of the user equipment based on the one or more height thresholds and the current height.

14. The device according to claim 13, wherein the processing circuitry is further configured to:
turn on the flying mode in a case that the current height is higher than the smallest height threshold of the one or more height thresholds.

15. The device according to claim 13, wherein the processing circuitry is further configured to:
turn off the flying mode in a case that the current height is lower than or equal to the smallest height threshold of the one or more height thresholds.

16. The device according to claim 7, wherein the one or more height thresholds are pre-configured, from the base station or from other user equipment.

17. The device according to claim 7, wherein the user equipment is an Unmanned Aerial Vehicle.

18. The device according to claim 7, wherein the processing circuitry is further configured to perform a communication related operation.

19. A method in a wireless communication system, the method comprising:
configuring operation of a user equipment based on one or more height thresholds for the user equipment and a current height of the user equipment directly or indirectly;
generating measurement configuration information for the user equipment, so that the user equipment reports information related to the current height based on the measurement configuration information; and
receiving the information related to the current height from the user equipment reported in response to a condition that the current height is higher than a smallest height threshold of the one or more height thresholds.

20. A method in a wireless communication system, the method comprising:
generating information directly or indirectly related to a current height of a user equipment, in response to measurement configuration information generated by a base station, the information being to be sent to the base station for the base station to configure operation of the user equipment based on the information and one or more height thresholds for the user equipment; and
reporting the information related to the current height of the user equipment in response to a condition that the current height is higher than a smallest height threshold of the one or more height thresholds.

* * * * *